United States Patent

Sjöberg et al.

[11] 3,689,741
[45] Sept. 5, 1972

[54] BOMBING INSTRUMENT FOR TARGETS HAVING TRANSVERSE MOTION RELATIVE TO AIRCRAFT FLIGHT PATH

[72] Inventors: Bengt Sjöberg; Oskar Viberg, both of SAAB Aktiebolag, Linkoping, Sweden

[22] Filed: July 8, 1970

[21] Appl. No.: 53,260

[30] Foreign Application Priority Data

July 9, 1969   Sweden .....................9717/69

[52] U.S. Cl. ......235/61.5 D, 235/61.5 E, 235/61.5 S, 235/150.2, 235/150.26
[51] Int. Cl. ..........................G05d 1/10, G06f 15/50
[58] Field of Search ........235/61.5 E, 61.5 D, 61.5 S, 235/150.2, 150.26

[56] References Cited

UNITED STATES PATENTS

| | | | |
|---|---|---|---|
| 2,898,809 | 8/1959 | Ryan | 235/61.5 D X |
| 2,923,465 | 2/1960 | Arshal | 235/61.5 E |
| 3,010,676 | 11/1961 | Shelley | 235/150.27 X |
| 3,230,349 | 1/1966 | Spangenberg et al | 235/150.2 X |
| 3,510,636 | 5/1970 | Turboult | 235/150.2 X |

Primary Examiner—Eugene G. Botz
Assistant Examiner—R. Stephen Dildine, Jr.
Attorney—Ira Milton Jones

[57] ABSTRACT

In an aircraft bombing instrument for attacks crosswind and against targets moving transversely to the line of flight, a transparent screen in the pilot's forward field of vision displays a command symbol and an aircraft situation symbol. A switch actuation initiates a first bombing attack phase in which the display defines a sight axis that can be displaced (according to pilot selection) laterally to either side as well as downwardly relative to the aircraft's longitudinal axis. While the pilot maneuvers the aircraft to hold the sight symbol aligned with the target, the instrument computes the aircraft velocity vector relative to the ground. A second switch actuation initiates a second phase during which display and maneuver continues as before and the instrument additionally computes the target's position and velocity vector relative to the aircraft. A third switch actuation initiates a final phase in which displacement of the command symbol relative to the situation symbol signifies banking and pull up instructions to the pilot, in following which he flies a curving ground track. During the final phase the instrument computes the point of time and aircraft velocity vector at which a bomb must be released to hit the target and the bank and pull up required to achieve these, controls the command display accordingly, and issues a release impulse at the proper time.

11 Claims, 23 Drawing Figures

INVENTORS
Bengt Erik Sjöberg
Oskar Einar Viberg
By Ira Milton Jones
ATTORNEY

INVENTORS
*Bengt Erik Sjöberg*
*Oskar Einar Viberg*
BY
ATTORNEY

BOMBING INSTRUMENT FOR TARGETS HAVING TRANSVERSE MOTION RELATIVE TO AIRCRAFT FLIGHT PATH

This invention relates to aerial bombing instruments of the type that effect automatic release of a bomb from an aircraft at a time when the altitude and velocity vector of the aircraft are such that a bomb released therefrom will follow a trajectory that will bring it to a preselected target, and wherein computation of the release instant is effected on the basis of parameters that can be ascertained at the aircraft, including parameters which define the relationship of the aircraft to the target at an instant during the bombing attack when the pilot of the bombing aircraft discerns that a predetermined sighting axis in the aircraft is aligned with the target and actuates a manual control which in effect identifies the target to the instrument.

Prior bombing instruments for aircraft have required that the aircraft maintain a substantially straight track over the ground during its bombing run. With the advent of the so-called toss bombing instrument of U.S. Pat. No. 2,609,729 to Wilkenson et al it became possible to accomplish accurate delivery of a bomb to a target from an aircraft that was following a curving flight path; but the curvature of the flight path was in elevation, that is, in changing rates of climb and descent, and all maneuvering was confined to a single vertical plane through the target. Through the years many improvements and modifications were made on the instrument of the pioneer Wilkenson et al patent, adapting it for a variety of bombing maneuver modes so that pilots using such instruments would have more freedom for maneuver within the vertical plane through the target. But all such prior instruments, in requiring a straight ground track, imposed a constraint upon the pilot that tended to compromise his security, for defending forces knew that once he was committed to his bombing run, his position was predictable to the extent that it was within a defined plane, even if his motion within that plane could not be forecast with certainty.

From the standpoint of bombing accuracy such prior instruments also left something to be desired, since they could not take account of relative movement between the bombing aircraft and the target in directions lateral to the aircraft, and could not afford guidance to the pilot in banking to compensate for a cross wind or for movement of the target transversely to his direction of attack. Because of this limitation, such prior instruments imposed upon the pilot a practical constraint to plan his attack in a direction parallel to the wind or to the direction of target movement in order to insure bombing accuracy; hence the vertical plane in which his attack would be made was generally predictable by defending forces, who could prepare their defenses accordingly.

Another disadvantage of prior bombing instruments of the character described was that they calculated the velocity vector of the aircraft on the basis of measurements which included a continuous measurement of the angle of relative wind, that is, the aerodynamic angle of attack of the aircraft taken with respect to a longitudinal datum line in the aircraft. Measurements of relative wind did not always afford a correct conception of the flight path of the aircraft relative to the ground, since a vertical gust could be interpreted by such an instrument as an instantaneously changed velocity vector and could thus give rise to an erroneous bomb release impulse.

The principal object of the present invention is to provide a bombing instrument which overcomes the above discussed disadvantages of prior devices.

It will be understood that a crosswind bombing run against a stationary target presents essentially the same problem as a bombing attack against a target moving transversely to the flight path of the aircraft at the initiation of the bombing run, in that in both cases the target can be regarded as being in relative transverse motion with respect to the aircraft.

Hence it is another object of this invention to provide an aerial bombing instrument which is adapted to effect automatic release of a bomb at a point in the flight of an aircraft carrying the same at which the bomb will follow a trajectory that terminates at a selected target, and which instrument comprises sight means whereby the pilot is provided with a command indication by which he is enabled to maintain a curving ground track after sighting upon a target that has transverse motion relative to his initial flight course, which curving track compensates for such relative motion of the target.

It is also an object of this invention to provide a bombing instrument whereby the pilot is given substantial freedom of choice of aircraft speed as well as of aircraft flight path during the bombing attack, so that he has a high degree of security against defensive countermeasures.

It is a further object of this invention to provide an aircraft bombing instrument of the character described which can comprise a digital computer.

With these observations and objectives in mind, the manner in which the invention achieves its purpose will be appreciated from the following description and the accompanying drawings, which are intended to exemplify the invention rather then to define it, the invention being defined by the appended claims.

The accompanying drawings illustrate one complete example of an embodiment of the invention constructed according to the best mode so far devised for the practical application of the principles thereof, and in which:

FIG. 6 illustrates the display on the transparent screen when the pilot has obeyed the command depicted in FIG. 5;

INSTRUMENT IN GENERAL

Figure 1:
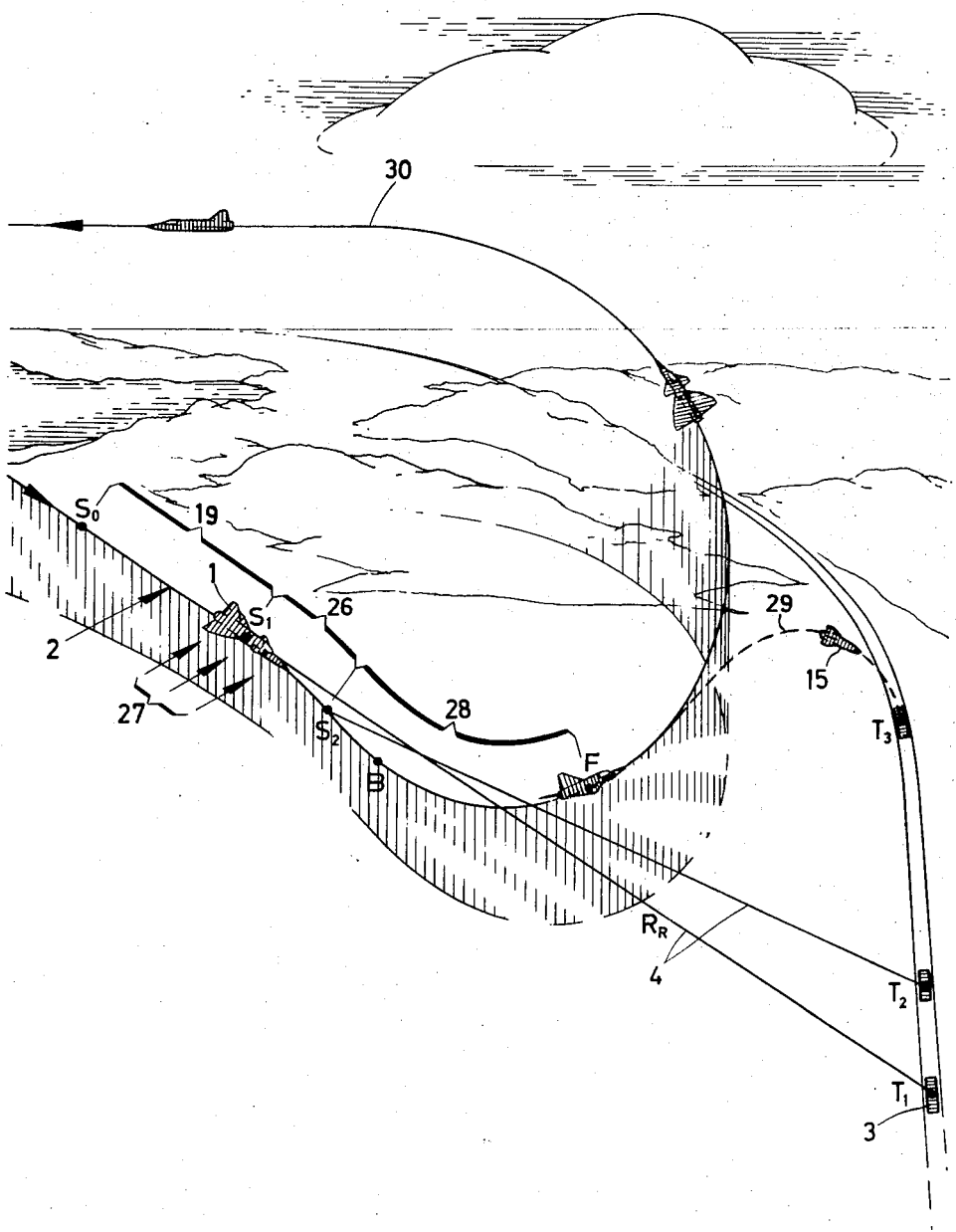
FIG. 1 is a perspective view illustrating the path of an aircraft equipped with a bombing instrument of this invention and the trajectory of a bomb released therefrom in the course of a bombing attack against a moving target.
Figure 2:
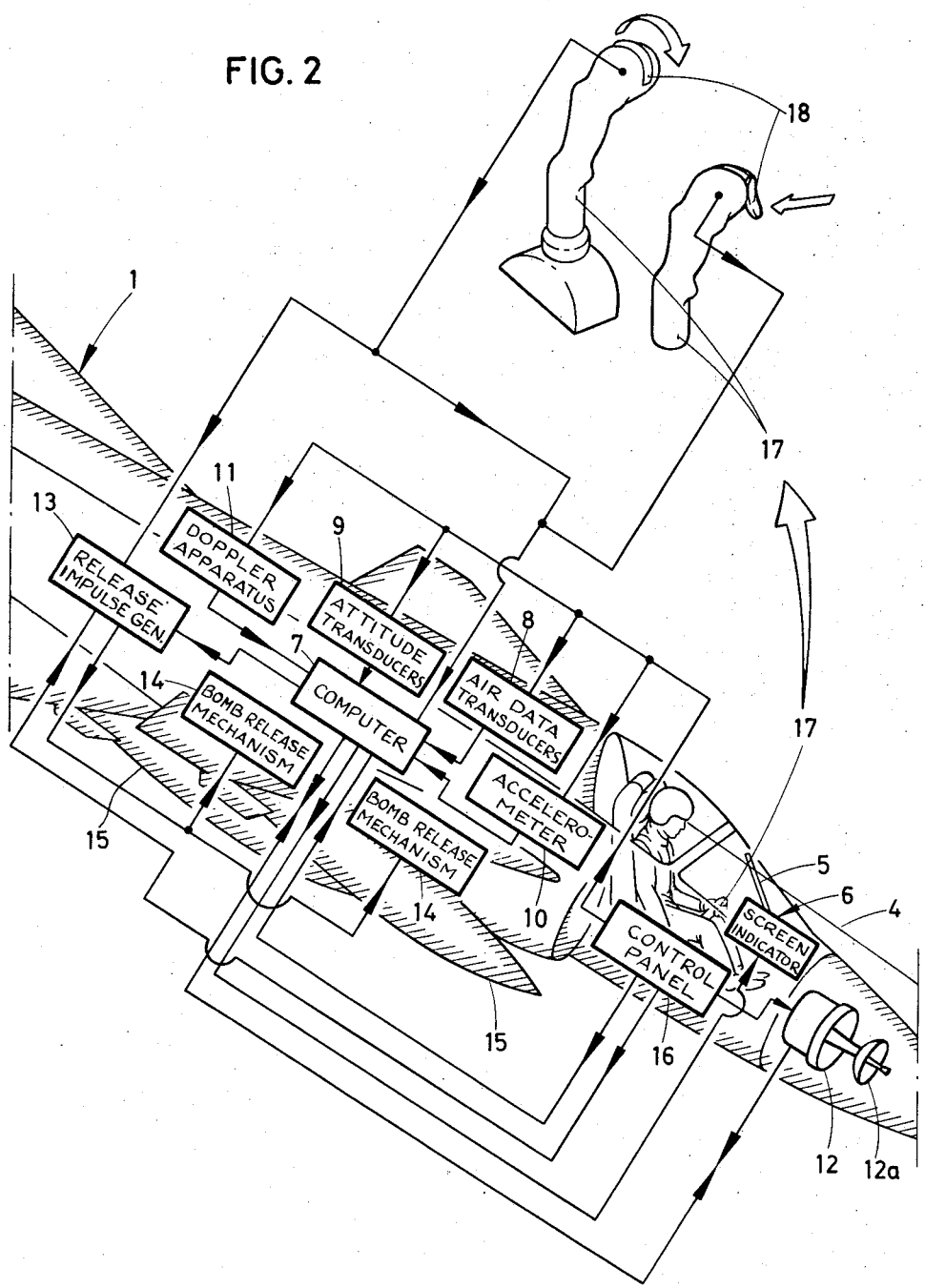
FIG. 2 is a block diagram showing the main components of an instrument embodying the principles of this invention, illustrated generally in their relation to a bomber aircraft in which the instrument is carried.
Figure 12:
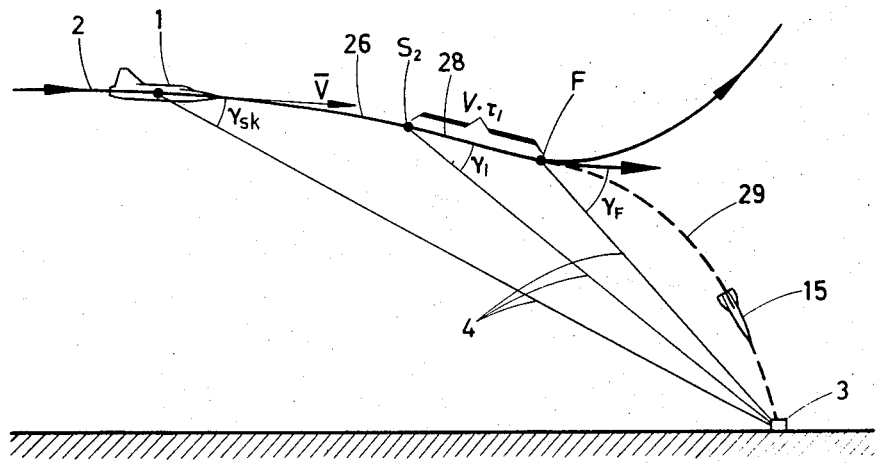
FIGS. 12 and 13 are diagrammatic side views of bombing attack flight paths with different angles of sight axis depression.
Figure 13:
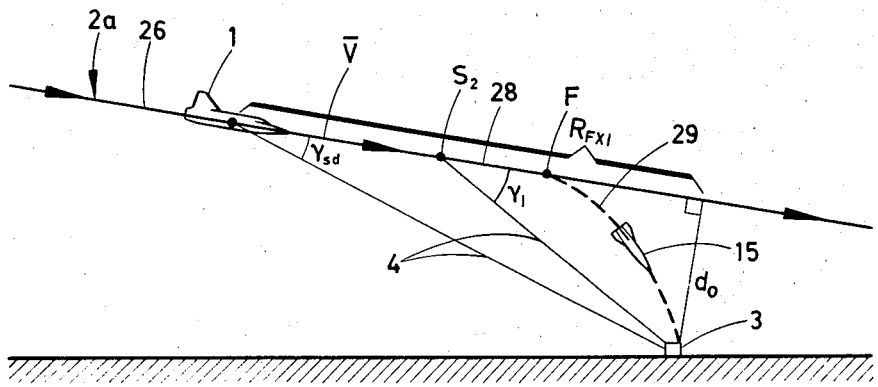

Referring now to the accompanying drawings, the numeral 1 designates an aircraft equipped with a bombing instrument embodying the principles of this invention, which instrument is employed to cause a bomb 15 that is carried by a bomb release mechanism 14 in the aircraft to be released at a point in the aircraft flight path 2 such that the bomb will follow a trajectory that carries it to a preselected target 3. The flight path of the aircraft at the instant of release can be so selected that the aircraft is then maintaining a substantially constant vertical speed, as illustrated in FIG. 13, or is following a downwardly curved path (so-called "bunt" release) as illustrated in FIG. 12; and the instrument also provides for preselection of a combination of either of these vertical flight paths with either a straight track over the ground or a curving ground track as illustrated in FIG. 1.

The components of the instrument that have interface with the pilot comprise a transparent screen indicator 6, also known as a head up display, a pickle switch 18 which is preferably mounted on the control stick 17 of the aircraft and which serves as an unlocking and firing switch, and certain manually positionable controls (described hereinafter) located on a control panel 16 that is readily accessible to the pilot.

The indicator 6 comprises a transparent screen 5 mounted in the pilot's forward line of sight and upon which are projected certain situation and command indicia. Such indicia thus appear to the pilot to be superimposed upon what he sees outside the airplane when looking forwardly through the windscreen, and he can therefore observe such indicia while maintaining his normal visual field of reference outside the aircraft. The indicia projected onto the screen (see FIGS. 3 and 4) comprise a situation display symbol 20 and a command display symbol 21. The situation display symbol is intended to represent the aircraft in its movement, as seen from the rear, and to this end it comprises a circle 22, representing the fuselage with the longitudinal ($x$) axis at its center, a pair of generally horizontal lines 23 extending from diametrically opposite sides of the circle and representing the wings, and a line 24 which extends upwardly from the circle, perpendicularly to the lines 23, and which represents the fin. The command display symbol comprises a dot 25 and a pair of parallel generally upright lines 26 spaced equal distances to opposite sides of the dot and symmetrical to it.

The instrument also comprises certain input devices or receptors, as described hereinafter, a computer 7, and a release impulse generator 13 which, at the appropriate instant, is caused to issue a release impulse to the bomb release mechanism 14.

USE OF THE INSTRUMENT IN A BOMBING ATTACK

A bombing attack made with the instrument of this invention can be regarded as comprising three phases:

I — a directing phase which corresponds to that part of the flight path 2 that is embraced by the bracket 19 in FIG. 1;

II — a measuring phase designated by the bracket 26 in FIG. 1; and

III — a release phase designated by the bracket 28.

I. DIRECTING PHASE OF ATTACK

During the directing phase of the attack the symbols on the transparent screen 5 are utilized by the pilot in accomplishing a preliminary alignment upon and tracking of a selected target, so that the pilot is prepared to continue tracking during the subsequent measuring phase in which data derived from target tracking will be automatically fed into the instrument's computer.

Before initiating the directing phase the pilot will make adjustments to instrumentalities on his control panel 16 to set up the instrument for certain variables that can be known in advance of the attack, such as the ballistic characteristics of the particular bomb to be used.

The pilot initiates the directing phase, at the point $S_o$ in FIG. 1, by actuating a switch on the control panel 16 which starts the automatic functioning of the instrument. It will be understood that the aircraft is directed generally toward the target at the time of actuation of that switch, and upon its actuation the situation and command symbols are displayed on the screen 5. On the basis of the bombing mode and tactic he intends to employ, the pilot also adjusts controls 16a, 16b, 16c on the control panel 16 (see FIG. 11) to provide for predetermined displacements of the sight axis laterally (in the xy-plane of the aircraft) and vertically (in the xz-plane of the aircraft) from coincidence with, or parallelism to, the longitudinal ($x$) axis of the aircraft.

During the directing and measuring phases of the attack the dot 25 of the command symbol defines the pilot's sight axis 4.

Figure 3:
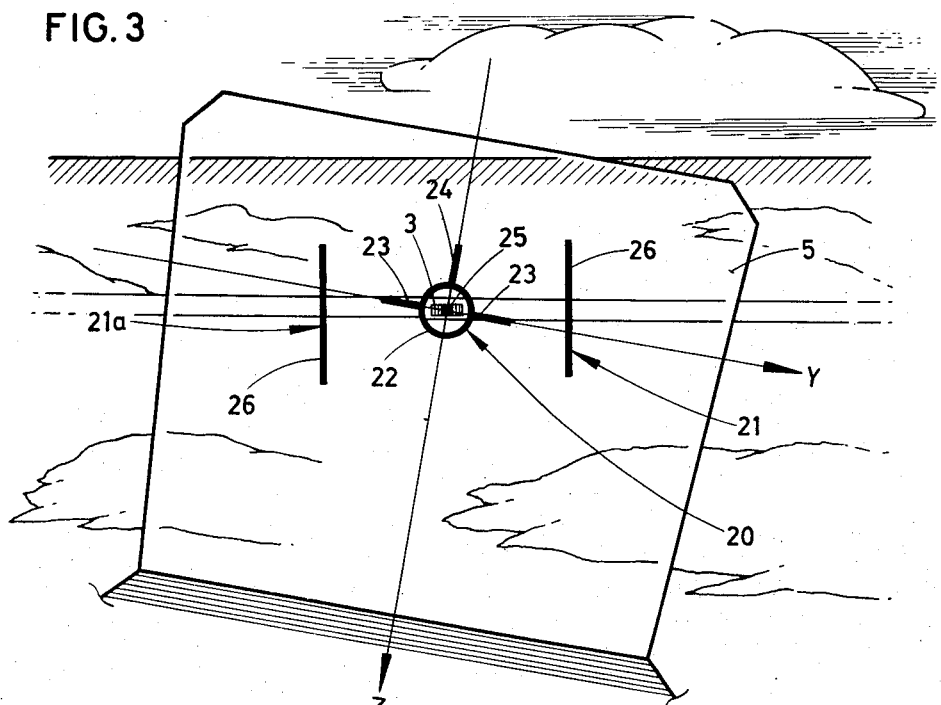
FIGS. 3 and 4 are perspective views of a transparent screen that is within the pilot's line of sight, illustrating two arrangements of situation and command indicia that might appear thereon during the aiming and measuring phases of a bombing attack.
Figure 4:
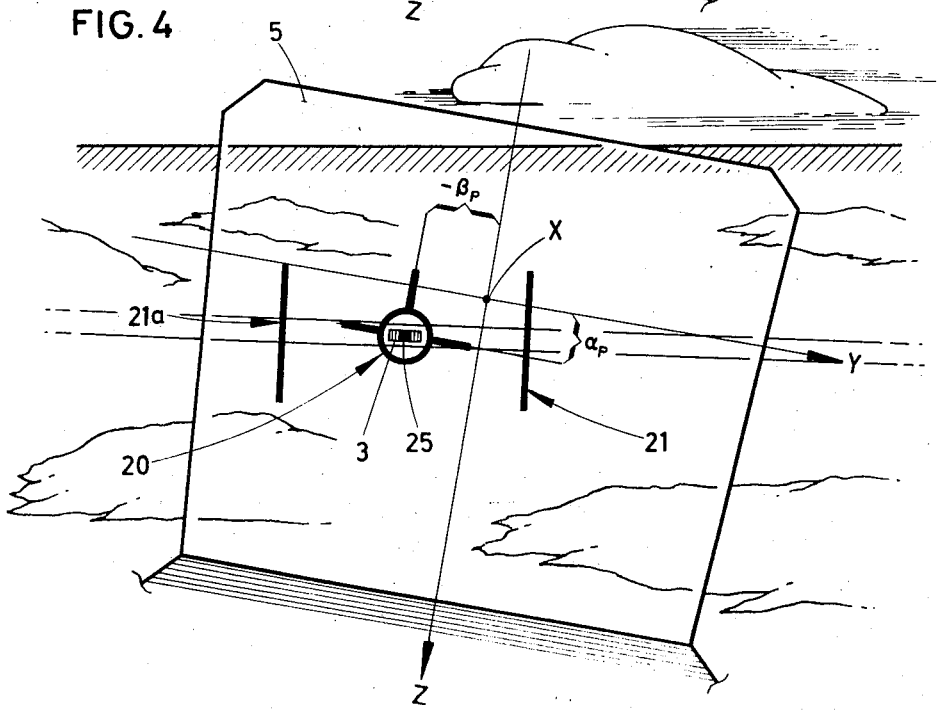

FIG. 3 illustrates the display on the screen during the directing phase with zero adjustments for both lateral and vertical deflection of the sight axis, and with the aircraft slightly banked. The dot 25 then defines a sight axis 4 which is parallel to the longitudinal ($x$) axis of the aircraft. FIG. 4 illustrates the display with an adjustment for downward depression and lateral offset of the sight axis appropriate to the particular bombing attack maneuver illustrated in FIG. 1.

During the directing phase the pilot so maneuvers the aircraft as to bring the dot 25 into coincidence with the target 3 and maintain it there, as shown in FIG. 4. When he is satisfied that he has his sight axis thus aligned on the target, he moves the pickle switch 18 on the control stick 17 outwardly and forwardly to unlock the computer 7 and the bomb release means 14.

II. MEASURING PHASE

The directing phase terminates and the measuring phase begins at the instant that the pilot actuates the pickle switch as just described. This is designated by the point $S_1$ in FIG. 1. During the measuring phase the display on the screen 5 remains the same as during the directing phase, and the pilot so maneuvers the aircraft as to maintain the dot 25 of the command symbol aligned on the target. During the measuring phase such maneuvering of the aircraft in effect identifies the target to the computer, and from various transducers (identified hereinafter) which provide data inputs to the computer, the computer makes a calculation of:

- the speed vector of the aircraft referenced to the ground and to the axis defined by the dot 25 of the command symbol,
- a position vector for the target relative to the aircraft, and
- a calculated value of relative velocity component of the target taking account of the wind component designated in FIG. 1 by 27.

Thus during the measuring phase the pilot enables the computer to make preliminary calculations — which are in effect measurements — that are utilized by the computer in the directly subsequent release phase.

The measurement phase is concluded by the pilot's actuation of the pickle switch 18 to a firing position, and the release phase begins at the same instant. The point in the flight path at which this occurs is designated by $S_2$ in FIG. 1.

III. RELEASE PHASE

During the release phase the instrument in effect assumes command of the aircraft, and the pilot follows its instructions as displayed on the transparent screen 5. On the basis of data acquired during the measurement phase and other data previously stored by adjustment of manually positioned instrumentalities on the control panel 16, the instrument makes successive computations for the release conditions for the bomb, including calculation of a predicted aircraft velocity vector and a coordinated predicted point of time when the bomb must be released to hit the target, and the degree of bank and rate of pull-up required to bring the aircraft to that predicted velocity vector at that time. On the basis of the calculation of required bank and pull-up rate, maneuvering instructions are displayed to the pilot on the transparent screen 5, and the pilot, in obeying these instructions, brings the aircraft to the predicted point at the predicted time so that the bomb, then automatically released by an impulse from the instrument, will follow a trajectory which brings it to the target.

Termination of the release phase occurs when the instrument issues a release impulse to the bomb rack 14, releasing the bomb. The point at which this occurs is designated by F in FIG. 1. The instant of release is signified to the pilot by the disappearance from the transparent screen of the command and situation display symbols. They may be replaced on the screen by navigational indicia by which the pilot is assisted in returning to his home base along a predetermined flight path 30.

DISPLAY TO THE PILOT

In all phases of the bombing run the attitude of the situation display symbol 20 corresponds to that of the bomber aircraft, that is, its "wings" 23 are always parallel to the wings of the actual aircraft. During all phases, too, the sighting dot 25 of the command symbol remains centered between the parallel sighting lines 26.

During the directing and measuring phases the lines 26 maintain a true vertical orientation relative to the horizon and the dot 25 remains centered in the "fuselage" ring 22; hence the total sighting symbol 21a defines the pilots's sight axis 4 and gives him an indication of the degree of bank that he is maintaining.

Figure 5:
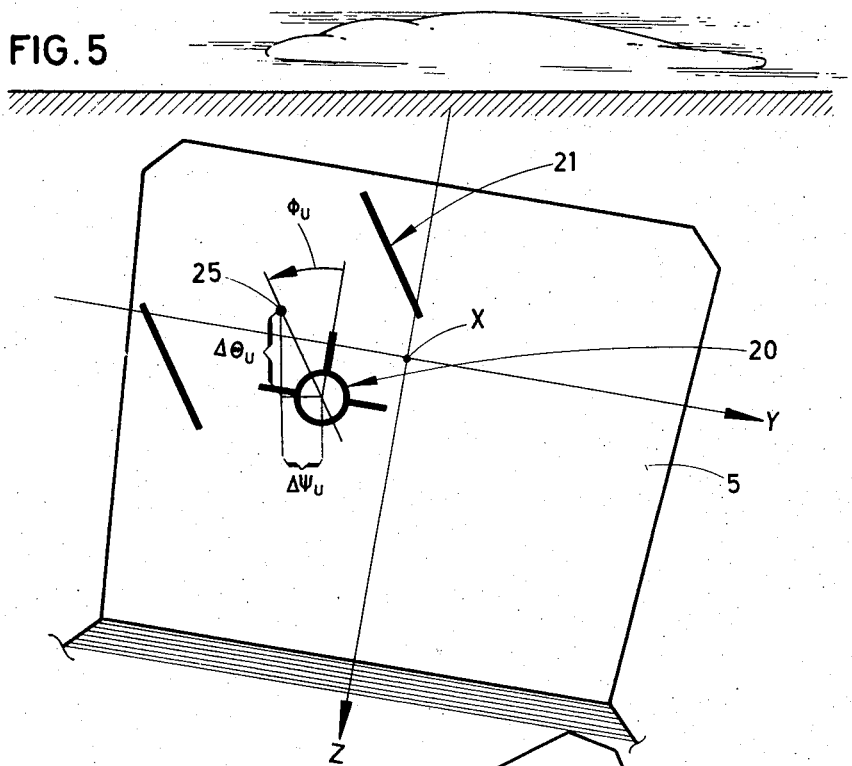
FIGS. 5 and 6 are views generally similar to FIGS. 3 and 4, but FIG. 5 illustrates a pull-up and banking command given to the pilot during the release phase of an attack
Figure 6:
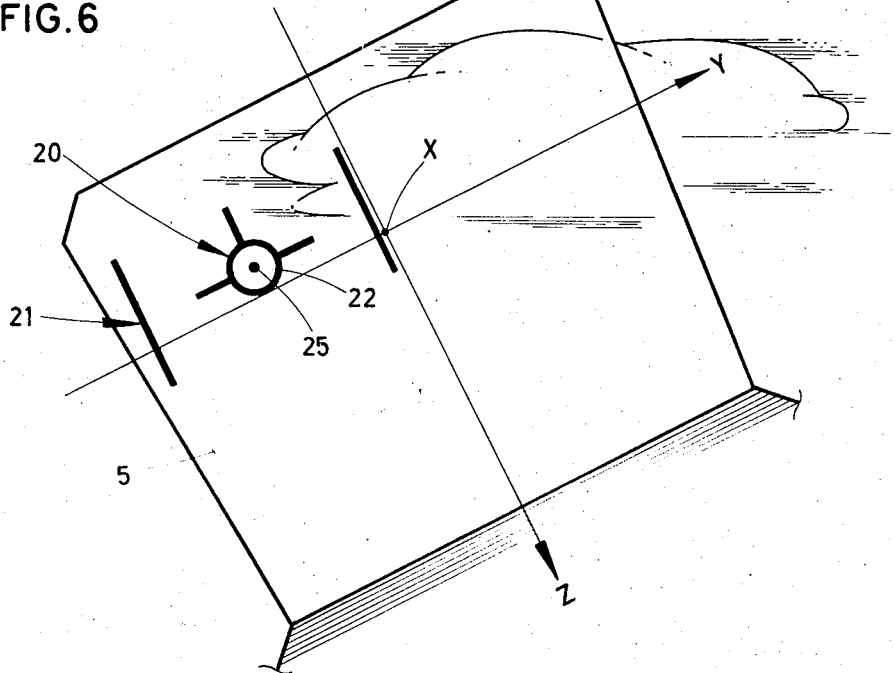

During the release phase the banking and pull-up commands are signified to the pilot by a displacement of the lines-and-dot command display symbol 21 relative to the situation display symbol 20, which displacement occurs instantaneously at the initiation of the release phase. FIG. 5 illustrates a command to pull up and roll to the left. The pilot, in obeying this instruction, so maneuvers his aircraft as to bring the situation display symbol 20, which represents his aircraft, to a position on the screen at which its "fuselage" (ring 22) will be centered on the dot 25 with its "wings" 23 perpendicular to the sighting marks 26. FIG. 6 illustrates the display as the pilot will see it when the instructions shown in FIG. 5 have been obeyed. Thus during the release phase the positions of the sighting lines 26 and the dot 25 signify the amount of roll and pull up which the pilot is required to achieve.

INPUTS TO THE COMPUTER

The following input data are supplied to the instrument automatically by transducers and the like that are connected with the instrument:

From air data transducers 8, the instrument receives inputs corresponding to:

$M$ = Mach number;
$T$ = Air temperature (absolute);
$P_S$ = Pressure altitude, i.e., barometric pressure prevailing at the altitude of the aircraft.

From gyro means 9 the instrument receives inputs corresponding to the angle between each of the three axes of the aircraft and the corresponding axes of a coordinate system referenced to the surface of the earth, the aircraft axes being:

$x$ = the longitudinal axis about which the aircraft rolls;

$y$ = the lateral axis about which the aircraft rotates in pitch (vectors to the right taken as positive);

$z$ = the vertical axis about which the aircraft yaws (downward vectors taken as positive);

and in the earth referenced axis system:

$x_o$ = a horizontal north-south axis (north taken as positive);

$y_o$ = a horizontal east-west axis; and $z_o$ = a vertical axis.

All axes are taken as intersecting at the aircraft center of gravity, and the angles between the aircraft referenced system and the earth referenced system are identified as follows:

$\phi$ = angle between the y-axis and the $x_o z_o$-plane (roll angle);

$\theta$ = angle between the x-axis and the $x_o y_o$-plane (pitch angle);

$\psi$ = angle between the y-axis and the $y_o z_o$-plane (yaw angle).

From an accelerometer 10 the instrument receives inputs corresponding to:

$A_x$, $A_y$, $A_z$ = the acceleration of the aircraft along its x-, y- and z-axes respectively.

From Doppler equipment 11 the instrument receives inputs corresponding to:

$V_D$ = velocity of the aircraft relative to the ground as measured by the Doppler equipment.

The instrument must also have an input corresponding to a function of the distance from the aircraft to the target. This can be either:

$R_R$ = aircraft-target distance as measured by radar equipment 12 in the aircraft; or $R_H$ = aircraft-target distance computed by triangulation, using the formula $$R_H = \frac{H_M}{\sin(\gamma_v + \gamma_s)}$$

where:

$H_M$ = barometric altitude (as obtained from air data transducer) corrected by a factor $\Delta_{H_M}$ for local ground pressure as manually set by the pilot on a control 16e;

$\gamma_v$ = angle between the aircraft speed vector and a horizontal plane; and $\gamma_s$ = angle between the aircraft speed vector and the sight axis defined by the aiming dot 25.

The following inputs are supplied to the instrument from manually adjustable controls accessible at the pilot's control panel 16:

$\gamma_{sk}$ = angle of depression of the sight axis defined by the dot 25, that is, the angle between that sight axis and the xy-plane of the aircraft axis system, A control 16a provides for selection of any one of three modes of sight axis depression:

1. Constant depression angle (which can be 0°) for the whole bombing run;
2. A manually settable depression angle which remains constant through the directing phase of the bombing run; or
3. An automatically and constantly increasing sight axis depression which so varies as to provide for a straight flight path throughout the bombing run, this being a mode which is particularly useful when the attack is to be made at very low altitude.

A control 16b provides for adjustment of the vertical displacement of the sight axis when the control 16a is set for its second mode.

A control 16c provides for selection of any one of three modes of lateral displacement of the sight axis:

1. No lateral displacement, i.e., the sight axis lies in the plane of the aircraft's x- and z-axes;
2. Displacement to the right of the xz-plane; or
3. Displacement to the left of the xz-plane. The magnitude of the lateral displacement $\psi_o$ in modes 2 and 3 is controlled by the instrument as a function of the magnitude of the sight axis depression angle, as explained hereinafter.

As hereinabove indicated, the instrument can also receive inputs from manually adjustable instrumentalities, corresponding to known characteristics of the bomb and to:

$\overline{W}_M$ = wind vector (as estimated or forecast for the target area) set in with suitable controls for wind direction and velocity on the panel 16.

CALCULATIONS MADE BY THE COMPUTER — IN GENERAL

The computer 7 is adapted and arranged to perform a large number of computing operations in time sequence, that is, all computations are made in repeated main cycles. The time sequence of the cycles is defined in that each cycle is started by a restart device 7b (see FIG. 8), in a known manner, in response to a time signal from an oscillator 7a of the computer. Special interruption programs can be introduced into the calculations in a known manner to randomly interrupt the main computing cycle. Such interruptions may include approximative interruptions and predictions intended to increase the resolution and improve the dynamic properties of the release signal supplied to the bomb release impulse generator 13 and of the control signal outputs to the sight indicator 6, used for positioning on the screen 5 the instruction symbols displayed to the pilot.

The calculations are made on the basis of quantities which are measured by the transducer means and stored as variables in the memory of the computer, other variables which are stored by manual presetting adjustments and which are thus in the nature of constants for a particular bombing run, and constants which are in effect built into the computer since they are invariant for all bombing attacks.

Figure 9:
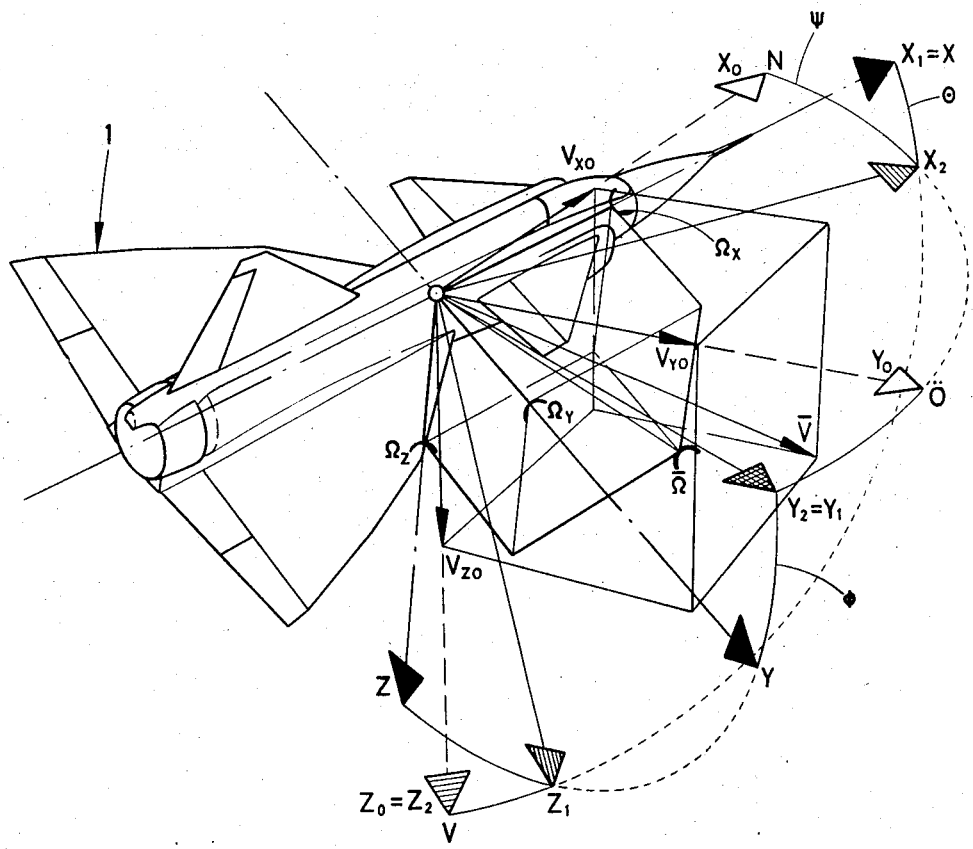
FIG. 9 is a perspective view illustrating the coordinate system used in the calculations, giving examples of resolutions of vectors used in the calculations.

Variables representing velocities and positions are treated, respectively, as velocity and position vectors, and each vector of the computation is resolved into components in one or more of the coordinate systems represented in FIG. 9. This requires transformations to be made from one to the other of the above described coordinate systems by reference to axis systems defined as follows:

$x_1 y_1 z_1$ = the system obtained by rotating the aircraft-referenced xyz-axis system through the angle $\phi$ around the x-axis;

$x_2 y_2 z_2$ = the system obtained by rotating the $x_1 y_1 z_1$-axis system through the angle $\theta$ around the y-axis, so that the $x_2 y_2$-axes are horizontal and the $x_2$-axis extends horizontally in the direction of flight. The $x_2$- and $y_2$-axes then make the angle $\psi$ to the $x_o$- and $y_o$-axes, respectively of the earth-referenced $x_o y_o z_o$-axis system, which is to say that the $x_o y_o z_o$-axis system is obtained by rotating the $x_2y_2z_2$-system through the angle $\psi$ about the $z_2$-axis.

From the foregoing it will be apparent that the following notations are also employed herein:

$\phi$ = angle of bank or roll of the aircraft;
$\theta$ = pitch angle of the aircraft;
$\psi$ = heading angle of the aircraft.

FIG. 9 illustrates the resolution of the vectors:

$\Omega$ = vector of rotation between the coordinate systems used in the computation; and $\overline{V}$ = the ground referenced speed vector of the aircraft, equal to the vector sum of $\overline{V}_L$ and $\overline{W}$, where $\overline{V}_L$ = the speed vector of the aircraft relative to the air, and $\overline{W}$ = the wind vector, obtained either from a computation using the Doppler input ($=\overline{V}_D - \overline{V}_L$) or as a manual wind vector presetting ($\overline{W}_M$).

Figure 15:
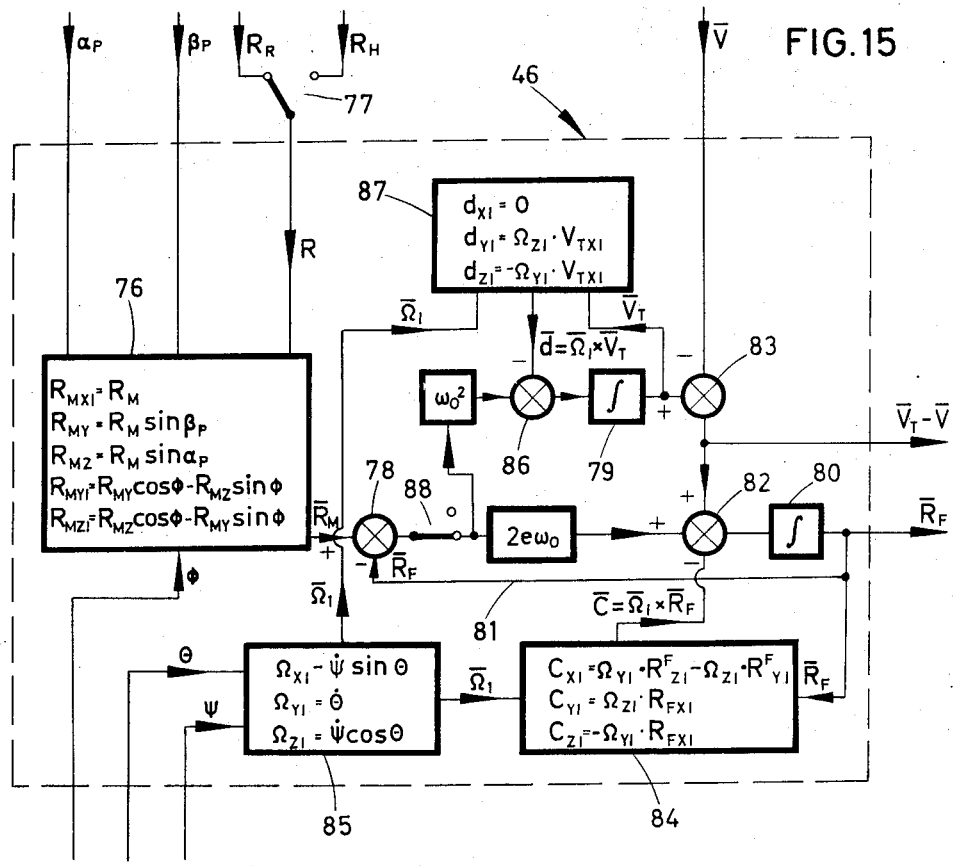

In FIG. 9, the vector $\overline{V}$ is resolved into component vectors $V_{x_0}$, $V_{y_0}$ and $V_{z_0}$ and the vector $\Omega$ is resolved into vectors $\Omega_x$, $\Omega_y$ and $\Omega_z$, the subscripts denoting the axis on which the component vectors are taken. Transformations from one coordinate system to another are made in a known manner in the computations. Filter computations occur as illustrated in FIGS. 10 and 15, carried out as computations of recursive equations of difference acting on the separate components of the respective vectors.

CALCULATIONS MADE DURING DIRECTING PHASE

During the directing phase the instrument is required to ascertain the velocity vector of the aircraft, that is, its velocity and direction of motion relative to the ground, and the velocity vector of the wind, so that the instrument is prepared to use these data in the measurement phase for the calculations which it then makes concerning the relationship between the aircraft and the target. During the directing phase the instrument also provides a display on the screen 5, which display is controlled by manual adjustments made by the pilot and establishes a selected angular relationship between the sight axis 4 and the aircraft axes.

Figure 10:
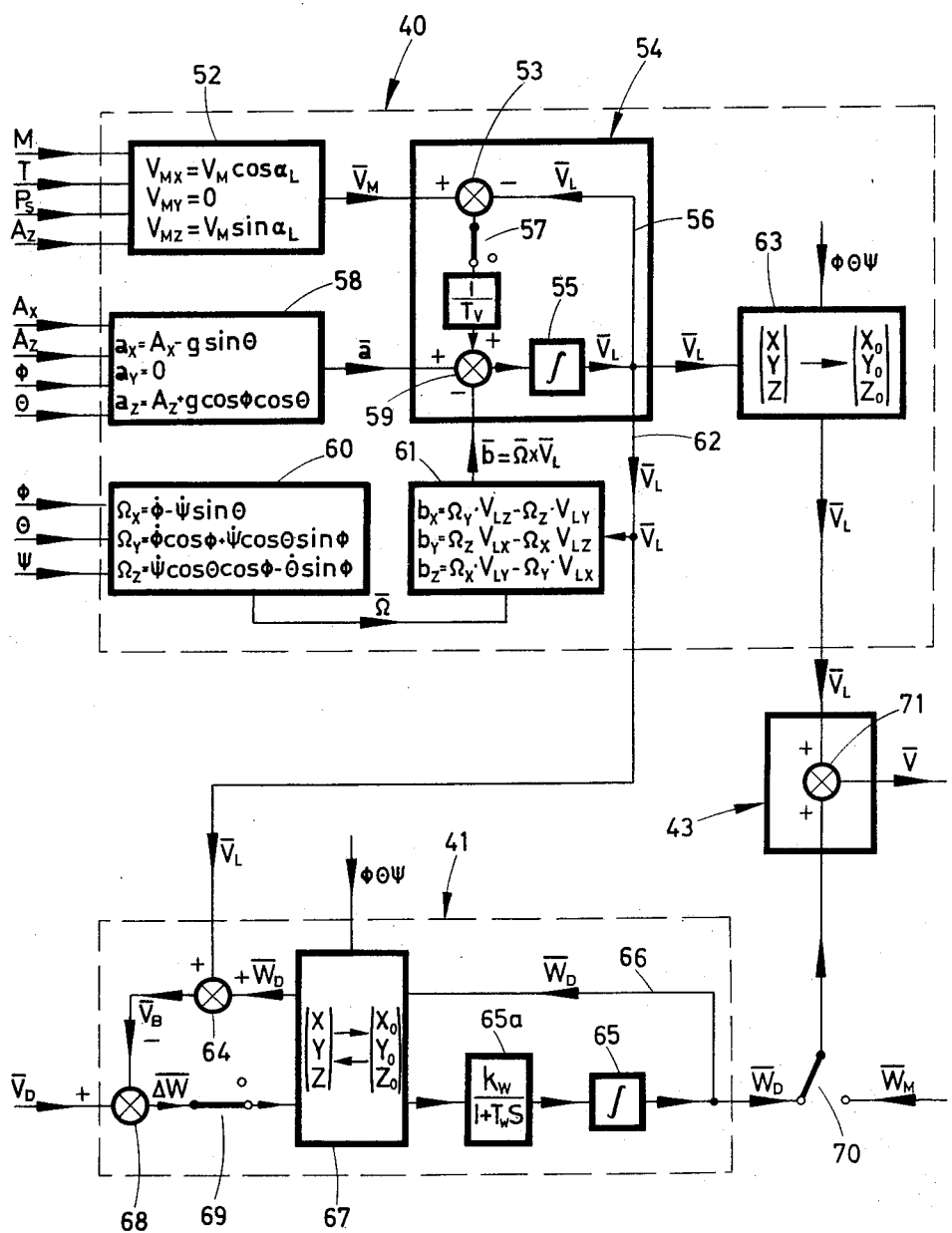
FIGS. 10 and 11 are more detailed block diagrams illustrating how certain portions of the calculations are carried out in the apparatus generally diagrammed in FIGS. 7 and 8.

FIG. 10 illustrates diagrammatically the means by which the velocity vector and the wind vector are computed and gives the formulas used in those calculations. FIG. 10 should be considered along with FIGS. 7 and 8 at this point.

Figure 7:
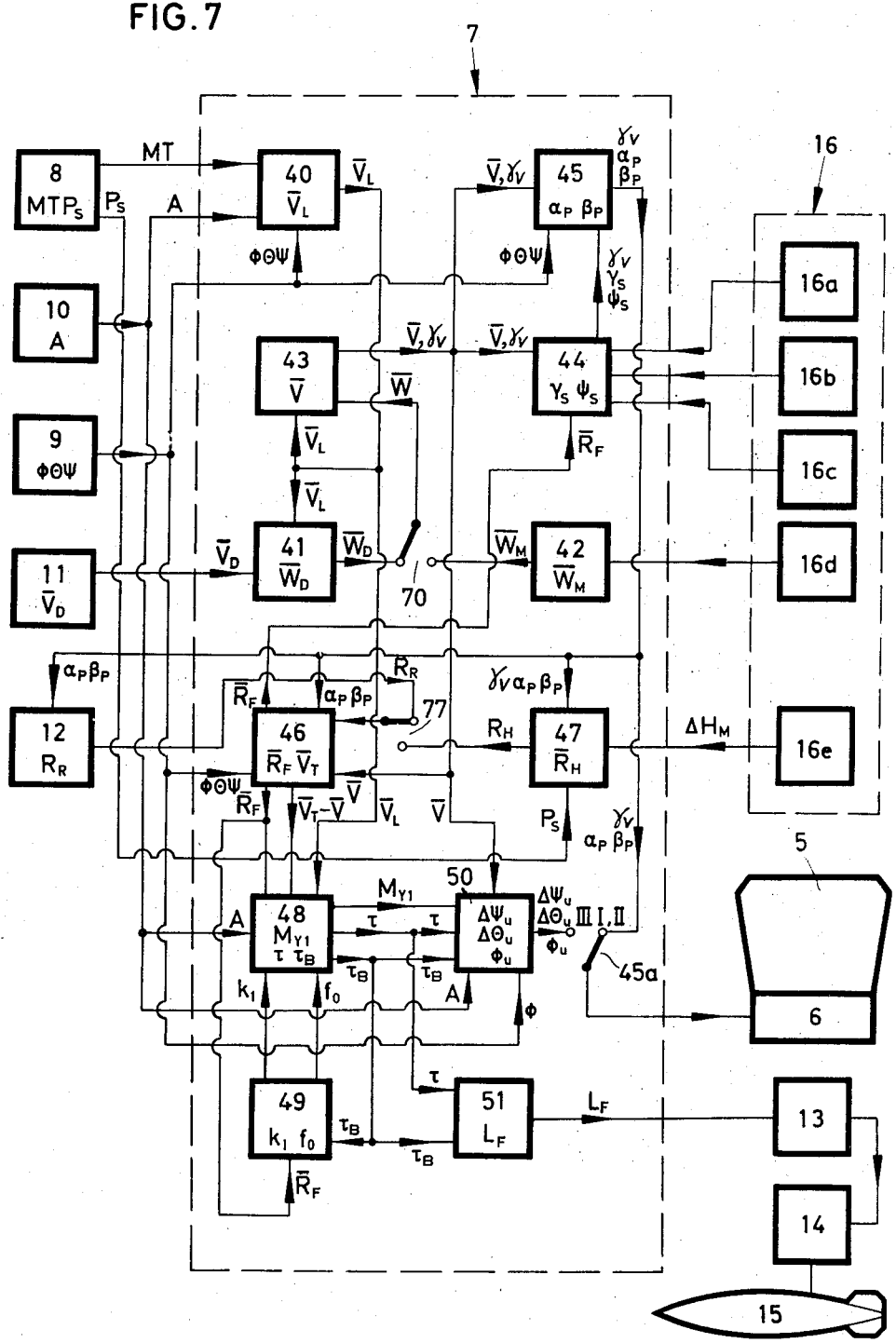
FIG. 7 is a block diagram of the data input units and the computer units of the bombing instrument of this invention, showing the signal flow between them during a bomb release calculation.
Figure 8:
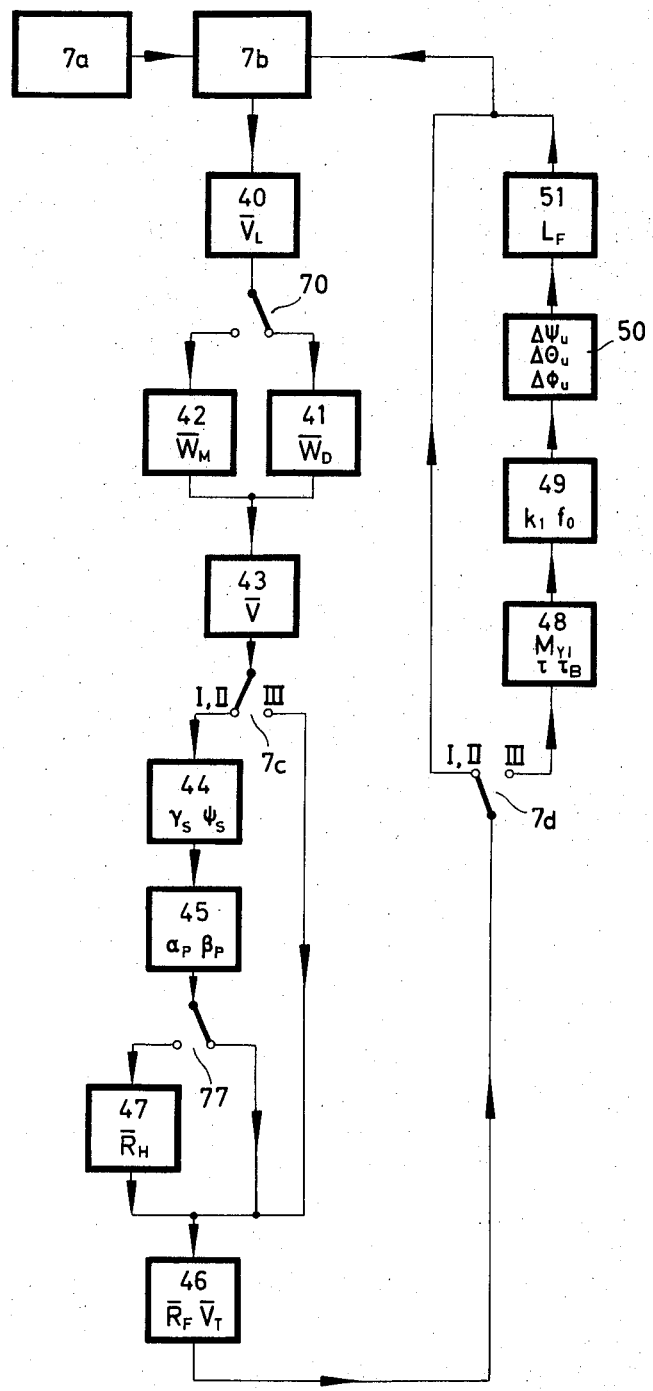
FIG. 8 is a time sequence block diagram showing a main cycle of the bomb release calculation.

The velocity vector $\overline{V}_L$ of the aircraft relative to the air is computed by apparatus illustrated as comprising block 40, which is shown in its general relationship to other main components in FIGS. 7 and 8 and which is illustrated in more detail in FIG. 10.

By means of known mechanism illustrated by block 52 in FIG. 10, for solving the equations therein set forth, a forward velocity vector of the aircraft relative to the air, $\overline{V}_M$, is calculated on the basis of the following inputs from transducers:

$M$ = Mach number,
$T$ = temperature of the air (taken as absolute temperature $T_k$),
$P_x$ = barometric pressure,
$A_z$ = acceleration along the z axis of the aircraft.

The $A_z$ input is utilized in known manner to compute $\alpha_L$ = the angle of attack of the aircraft, i.e., the angle between the xy-plane of the aircraft and the velocity vector of the aircraft relative to its surrounding air.

For calculation of the true velocity vector $\overline{V}_L$ of the aircraft relative to the air, the $\overline{V}_M$ output signal is fed to a summation point 53 of a low pass filter computing unit 54 comprising an integrator 55 that has a feedback 56 to the summation point. The filter computing unit thus comprises a closed filter circuit having the transfer function $(1°/1+T_v \cdot S)$, where the time constant $T_v$ of the low pass filter is determined by the amplification factor $1/T_v$ of the closed circuit, and $S$ is a Laplace operator. A switching element 57 is maintained in its closed condition during the directing and measuring phases to connect the integrator 55 with summation point 53, but is open during the release phase.

Inputs from the accelerometer corresponding to accelerations $a_x$ and $A_z$ along the x- and z-axes, respectively, and inputs from the gyro flight position transducers that correspond to $\phi$ and $\theta$ are fed into a computing mechanism of known type, denoted by block 58, which mechanism calculates the equations given in that block in FIG. 10 to produce an output signal corresponding to:

$\overline{a}$ = the acceleration vector of the aircraft. That output is fed to a summation point 59 in the filter computing unit 54, to be forwarded to the integrator 55.

The rotation vectors $\overline{\Omega}$ of the aircraft coordinate system-xyz relative to the earth referenced coordinate system-$x_0y_0z_0$ are calculated by computing means symbolized by block 60, which receives input signals from the gyro transducers and computes the equations set forth in that block. The output from the means of block 60 is forwarded to computing means represented by block 61, which calculates a cross-product vector $\overline{b} = \overline{\Omega} \times \overline{V}_L$ according to the equations given in block 61. The $\overline{V}_L$ signal output of the filter computing unit 54 is also fed into the means represented by block 61, and the signal output of the block 61 means is fed to the summation point 59 in the filter computing unit, so that the block 61 means is in a second and permanently connected feedback circuit with the filter computing unit 54.

The output signal $\overline{V}_L$ from the block 56 apparatus corresponds to the aircraft velocity vector relative to the air, referenced to the xyz-axis system of the aircraft. It is transformed in a transformation unit 63 which also receives inputs from the gyro transducers and which produces an output signal that corresponds to transformed $V_L$, the velocity vector of the aircraft relative to the air in the ground referenced $X_0y_0z_0$-coordinate system. The transformed $V_L$ output of the apparatus represented by block 40 is forwarded to a summation point 71 to be vectorially added to a wind vector output, in order to obtain an output corresponding to $\overline{V}$, the velocity vector of the aircraft relative to the ground.

If the Doppler apparatus is functioning, the wind vector $W_D$ is calculated on the basis of a Doppler signal input, an untransformed $V_L$ signal input, and gyro transducer inputs corresponding to $\phi$, $\theta$ and $\psi$, all fed to a wind vector filter computer 41. The $W_D$ output from that filter computer is also forwarded to the summation point 71. If the Doppler unit is not functioning, an automatic switching means 70 disconnects the calculating means 41 from the summation unit 71 and instead furnishes that unit with a $W_M$ wind input from the manual wind setting means 16d.

The Doppler wind vector filter computer 41 is a closed filter circuit built up around an integrator 65. The Doppler input signal $V_D$ is fed into the filter computer 41 through a difference unit 68. The total transfer function of the closed circuit comprising the filter computer 41 is $$\frac{1}{1+\frac{1}{K_W}\cdot S+\frac{T_W}{K_W}\cdot S^2}$$

where:

$K_W$ = amplification factor,
$T_W$ = time constant in the filter circuit, and
$S$ = Laplace operator.

The filtered output of the integrator 65, corresponding to the Doppler wind vector $\overline{W}_D$, is connected, through a feedback 66, with a coordinate transformer 67 in which the signal is altered in accordance with a transformation from the $x_0y_0z_0$-system to the xyz-system, thence to a summation unit 64 where it is summed with the untransformed velocity vector $\overline{V}_L$ to provide a signal corresponding to $\overline{V}_B$, the computed ground velocity vector. The $\overline{V}_B$ signal is subtracted from the measured $\overline{V}_D$ input at the difference unit 68, the output $\overline{\Delta W}$ of which is transformed back to the ground referenced system-$x_0y_0z_0$ in the coordinate transformer 67. The transformed $\overline{\Delta W}$ signal is fed through a low pass filter 65a to the integrator 65 where it is summed up.

Should the Doppler apparatus cease functioning during a bombing run, the filter circuit is automatically opened by switch means 69, and the integrator 65 then functions as a wind memory having a constant output $\overline{W}_D$.

Figure 11:
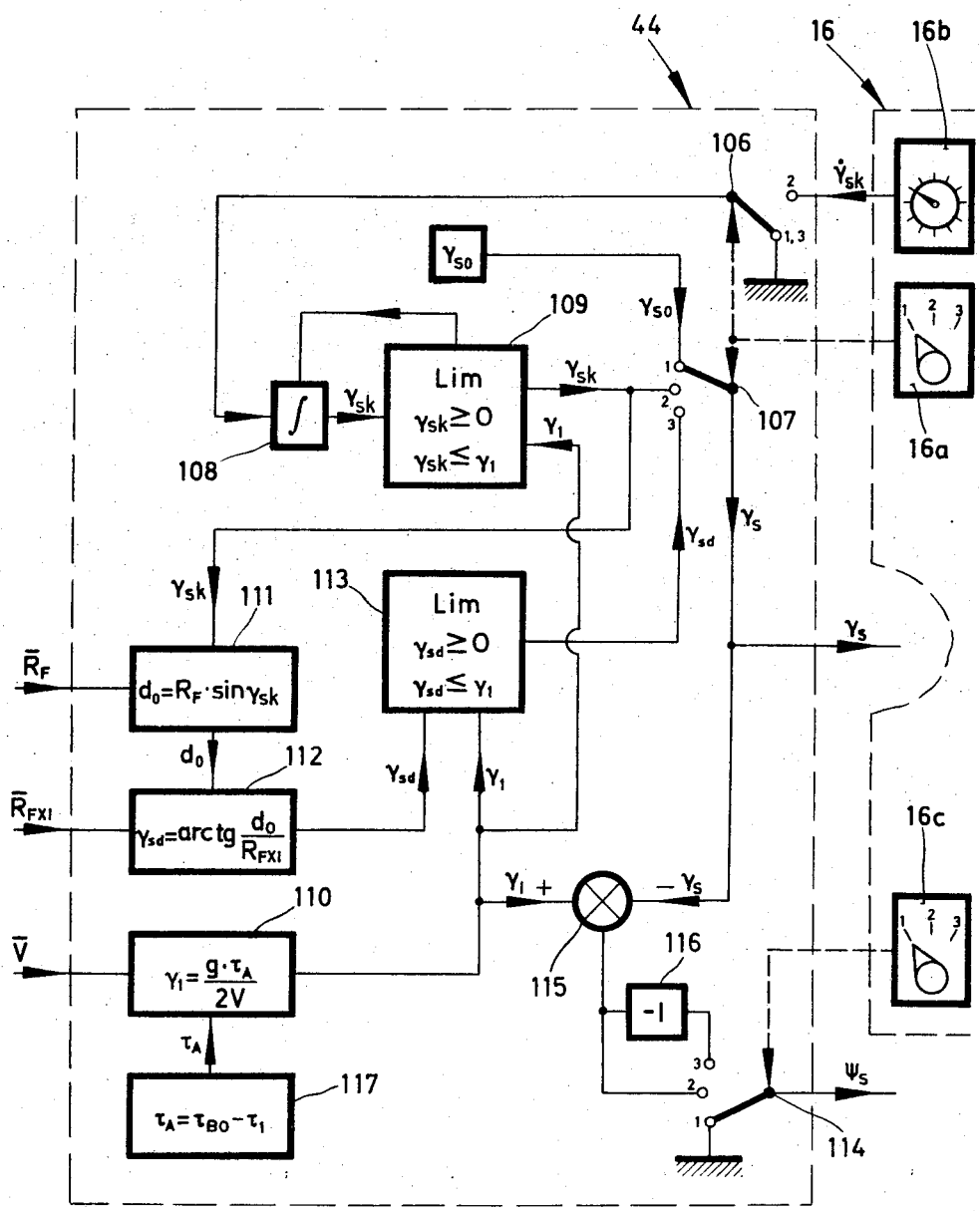
Figure 16:
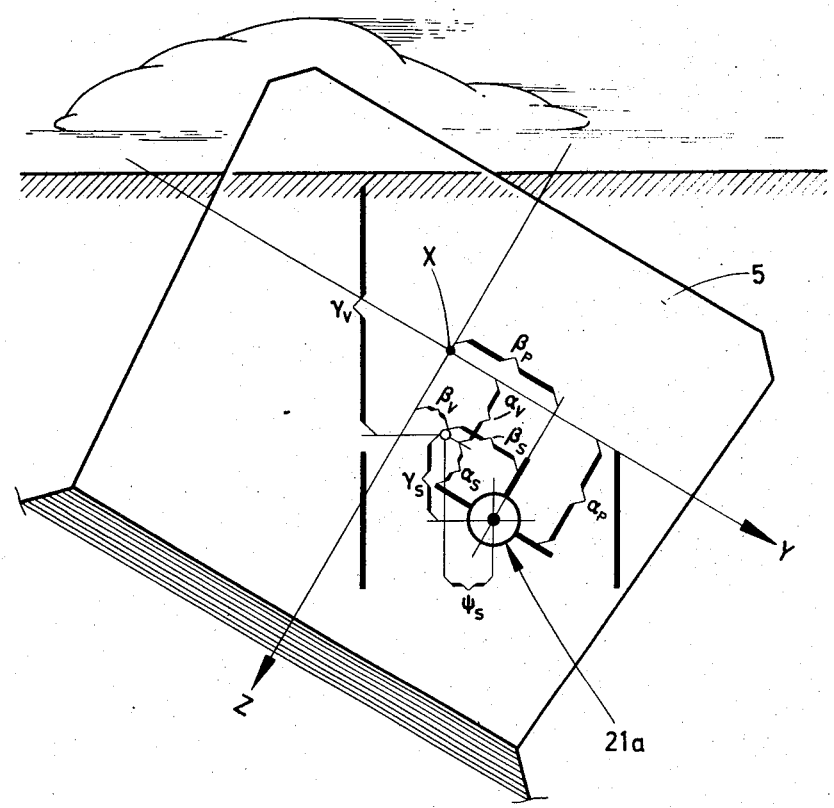
FIG. 16 is a view generally similar to FIGS. 3 and 4 but illustrating quantities used in controlling the position of the command symbol during the measuring phase of a bombing attack made with the instrument.

The output $\overline{V}$ of the summation unit 43 is fed, during the directing and measuring phases, to apparatus represented by block 44, details of which are illustrated in FIG. 11, which should be considered in connection with FIGS. 12, 13 and 16.

The apparatus 44 in effect controls the positioning of the slighting display on the transparent screen 5 during the directing and measuring phases, in accordance with manual settings made by the pilot, and it comprises two three-position switches 106 and 107 that are actuated by the manual control 16a for sight axis depression mode.

When the control 16a is in its position 1 (illustrated in FIG. 11) a constant sight axis depression signal corresponding to $\gamma_{so}$(e.g., sight axis depressed 3° below the x-axis) is supplied to the instrument, to effect a positioning of the dot 25 such that it defines a sight axis which remains fixed relative to the x-axis of the aircraft throughout the bombing maneuver.

In position 2 of control 16a the signal which controls the vertical position of the aiming dot 25 is derived from an integrator 108, and is initially a constant value (e.g., 0°). While observing the position of the aiming dot 25, the pilot, during the directing phase, adjusts a potentiometer control 16b to select a rate of change of sight axis depression $\dot{\gamma}_{sk}$ such that the dot 25 moves down at a rate that keeps step with the changing angle between the aircraft x-axis and the line connecting the aircraft with the target, as indicated in FIG. 12. Since the pilot endeavors to maintain his sight axis through the aiming dot fixed upon the target throughout the directing and measuring phases of the attack, the adjustment of the potentiometer 16b determines the mode of the bombing attack. The $\dot{\gamma}_{sk}$ output of the potentiometer 16b is fed to an integrator 108, the output of which is adapted to be limited by a limit means 109 to within two limit values. One of these limit values corresponds to a zero depression of the sight axis, and thus requires that the angle of sight axis depression remain positive (i.e., downwardly depressed) through the bombing run so that the attack path is restricted to a "bunt" path. The other limit of variation of $\dot{\gamma}_{sk}$ is a value $\gamma_1$, which is computed by means represented by blocks 110 and 117, performing the calculations set forth in those boxes, wherein:

$g$ = acceleration due to gravity,
$\tau_{bo}$ = recommended point of time of bomb release,
$\tau_1$ = positive time interval between the point in time at which the measuring phase is concluded and the point in time of bomb release. A value for this quantity can be built into the instrument as a constant.

The value $\gamma_1$, which is thus an allowed maximum value of the angle of sight axis depression, is computed to be less than an angle $\gamma_F$ (see FIG. 12) between the velocity vector of the aircraft and a line connecting the aircraft and the target at the point F at which a bomb has to be released to hit the target.

If the manual control 16a and its associated switch means 106 and 107 are set in position 3, the sight axis moves angularly downwardly at a rate which provides a flight path over the target that is straight as viewed from the side, as illustrated in FIG. 13. Means in the instrument represented by block 111 in FIG. 11 then computes the distance $d_o$, which is the predicted smallest distance between the aircraft and the target along the flight path that the airplane would follow if it continued straight along the path flown during the measuring phase (see FIG. 13). The calculation is made according to the equation set forth in block 111, wherein:

$\overline{R}_F$ = the position vector of the target relative to the aircraft calculated as explained hereinafter.

Calculating means represented by block 112 and computing the equation shown therein, uses as an input the output corresponding to $d_o$, and as another input a signal corresponding to $R_{Fx1}$ = the distance along the projected flight path between the aircraft and the point on said flight path to which $d_o$ is measured (see FIG. 13), to calculate the value of:

$\gamma_{sd}$ = the variation of the angle of sight axis depression required to have the sighting axis defined by the dot 25 remain aligned with the target during the measuring phase of the attack with the aircraft maintaining a straight path as viewed from the side.

The signal corresponding to $R_{Fx1}$ is computed as described hereinafter. The value of the $\gamma_{sd}$ signal is limited, by limiting means 113, to values between the same limits set for the $\dot{\gamma}_{sk}$ value, as above described.

The manual control 16c for adjustment of lateral displacement $\gamma_s$ of the sight is coupled with another three-position switch 114.

In its position 1, corresponding to no lateral displacement of the sight axis, the switch means 114 causes a zero signal for $\gamma_s$ to be issued, i.e., there is no lateral displacement of the sight axis from the xz-plane of the aircraft.

In position 2 of the switch means 114, corresponding to displacement of the sight axis to the right, the magnitude of such lateral displacement is computed by a difference instrumentality 115 as the difference between the maximum allowed sight axis depression angle $\gamma_1$ and the selected depression angle $\gamma_s$. This provides the pilot with a sufficient margin of time during the release phase to effect banking of the aircraft to the commanded value of the banking angle.

In position 3 of switch means 114 a lateral displacement to the left is provided for in the same manner as for the displacement to the right just described, except that a change in sign is introduced through an instrumentality 116.

Figure 14:
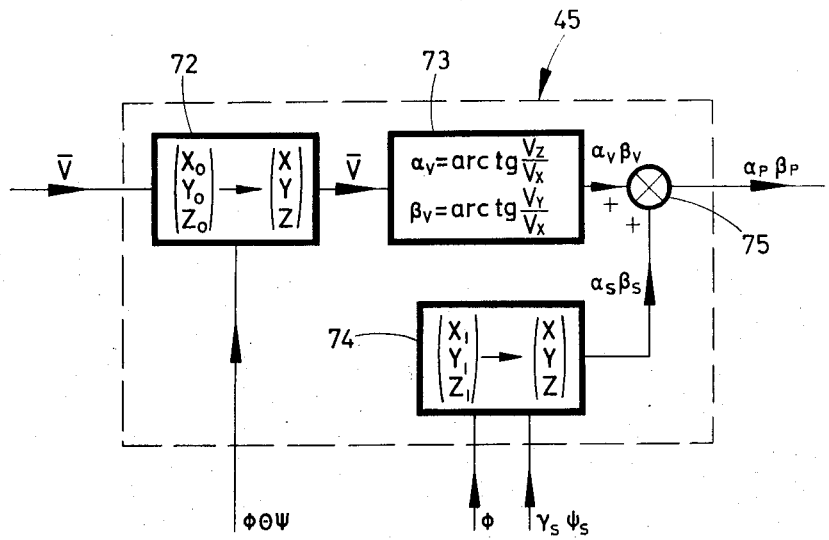
FIGS. 14 and 15 are other detailed block diagrams illustrating how certain other portions of the calculations are carried out.

FIGS. 14 and 16 illustrate more fully the computation during the directing and measuring phases of the angular position of the sighting symbol 21a comprising the command display symbol 21 and the situation display symbol 20. The ground referenced aircraft speed vector $\bar{V}$ is transformed in a coordinate transformation, by means denoted by the block 72, from the $x_0 y_0 z_0$-coordinate system to the aircraft referenced xyz-system, by rotation through the angles $\phi$, $\theta$ and $\psi$, after which, by means of apparatus represented by box 73 and computing the equations shown therein, outputs are produced that correspond to:

$\alpha_v$ = the angular position in the z-direction of the computed speed vector of the aircraft relative to the x-axis of the aircraft, and $\beta_v$ = the angular position in the y-direction of the computed speed vector of the aircraft relative to the x-axis of the aircraft.

By transformation means represented by block 74, the outputs from the block 44 apparatus, corresponding to the sight axis displacement angles $\gamma_s$ and $\psi_x$, are transformed, by rotation through the banking angle $\phi$, from the $x_1 y_1 z_1$-system to the aircraft referenced xyz-system, to produce transformed displacement outputs that are respectively designated $\alpha_s$ and $\beta_s$. These are added, at a summation point 75, to the $\alpha_v$ and $\beta_v$ outputs from the block 73 means to produce command display symbol position signals respectively corresponding to:

$\alpha_p$ = the angular displacement of the sight axis in the y-direction relative to the x-axis of the aircraft, and $\beta_p$ = the angular displacement of the sight axis in the z-direction relative to the x-axis to the aircraft.

The last mentioned outputs are fed through switch means 45a (FIG. 7) to the sighting indicator 6, where they cause the sighting symbol 21a to be displayed in a proper position, as illustrated in FIG. 16. The switch means 45a maintains a connection between the sight symbol instrumentality 6 and the box 45 instrumentality through the directing and measuring phases of the attack.

CALCULATIONS MADE DURING THE MEASURING PHASE

During the measuring phase, which is initiated by a first (outward and forward) movement of the stick mounted switch 18, the computer makes the same calculations as during the directing phase, as explained above, and, in addition, it also makes calculations of:

$\bar{R}_F$ = the position vector of the target relative to the aircraft, and $\bar{V}_T$ = the velocity vector of the target, including wind correction.

Thus during the measuring phase the instrument in effect determines the relationship of the motions of the target and the aircraft to one another and to the wind so that this relationship can be utilized in the bomb release calculations that occur in the next phase. Note that the wind factor is calculated as if it were a component of target motion, to simplify calculations relating to the motion of the aircraft.

The calculations of $\bar{R}_F$ and of $\bar{V}_T$ during the measuring phase are made alternatively by means of the instrumentalities represented by block 46 or block 47 (see FIGS. 7 and 15).

An instrumentality represented by block 76, which comprises a part of the block 46 apparatus (see FIG. 15), computes an unfiltered value of $\bar{R}_M$ = position vector of the target relative to the aircraft in the aircraft referenced xyz-coordinate system. Inputs to the block 76 instrumentality comprise signals from the block 45 instrumentality corresponding to $\alpha_p$ and $\beta_p$ (sight axis offset), and an input $R_R$ from radar apparatus 15. The antenna 12a of the radar set is slave controlled so that the axis of its center line coincides with the sight axis defined by the aiming dot 25, and therefore the $R_R$ output of the radar apparatus corresponds to the distance from the aircraft to the ground along the $\alpha_p$, $\beta_p$ direction. The radar is automatically locked to make a continuous measurement of this distance, and when the radar is locked onto ground echoes, switch means 77 is automatically closed to supply the computer with the $R_R$ signal.

Should the radar set not lock onto the ground return, the switch means 77 remains in a position in which the block 76 mechanism is supplied with an alternate input signal $R_H$, received from the instrumentality represented by block 47 and obtained from inputs corresponding to $H_M$ = altitude of the airplane above the target (obtained, e.g., as an output from barometric means corrected by the manually set (control means 16e) ground pressure value $\Delta H_M$), and to the angular position of the sight axis relative to the horizontal, given by $\gamma_v + \gamma_s$ (see FIG. 16). The distance $R_H$ is computed by triangulation according to:

$$R_H = (H_M / \sin(\gamma_v + \gamma_s)).$$

The instrumentality designated by block 76 also transforms the ground referenced position vector of the target, through the roll angle $\phi$, to the $x_1 y_1 z_1$-coordinate system, and thus produces an output corresponding to $R_M$ as above defined, which output is fed to a summation point 78 of a second order filter. The second order filter comprises circuits built up around two integrators 79 and 80 and has a total transfer function for the calculated velocity vector $V_T$ of the target which is given by:

$$\bar{V}_T = \frac{S \cdot \bar{R}_M + \bar{V}}{1 + \frac{2e}{\omega_0} \cdot S + \frac{S^2}{\omega_0^2}}$$

where $\omega_o$ is the band width of the filter function and e is its relative damping. The filter computations performed by the mechanism of block 46 are adapted to produce a signal corresponding to the velocity vector $\overline{V}_T$ of the target, in the form of a filtered differential quotient of the relative position of the target, obtained on the basis of the angular direction to the target and the distance to the target. The filter circuit is provided with a feedback 81 from the output of the integrator 80 to the summation point 78, for feeding back the filtered relative position $\overline{R}_F$. The difference $\overline{R}_M - \overline{R}_F$ is multiplied by a constant ($= 2e\,\omega_o$), and, through a summation point 82 is thereafter summed up in the integrator 80.

At another summation point 83 there are summed up inputs corresponding to $\overline{V}$ and to $\overline{V}_T$ to provide another input to the summation point 82 that corresponds to $\overline{V}_T - \overline{V}$, the velocity vector of the target relative to the aircraft. Also fed to the summation point 82 is a cross product vector $\overline{C} = \Omega \times \overline{R}_F$, computed by the instrumentality represented by block 84, which receives an input corresponding to $\Omega_1$, the rotation vector of the $x_1 y_1 z_1$ coordinate system relative to the xyz system (see FIG. 9). The input corresponding to $\Omega_1$ is in turn obtained from an instrumentality represented by block 85, having inputs corresponding to $\theta$ and $\psi$.

The difference vector output $\overline{R}_M - \overline{R}_F$ from the summation point 78 is also multiplied by a constant value $\omega_o^2$ and the output corresponding to this product is added at still another summation point 86 and fed to the integrator 79. Another cross product $\overline{d} = \Omega_1 \times \overline{V}_T$, computed by an instrumentality represented by block 87, is also fed to the summation point 86, and thence into the integrator 79. The output of the integrator 79 thus corresponds to the velocity vector $\overline{V}_T$ of the target.

The summation point 78 is connected into the filter circuit through switch means 88 that remains closed during the measuring phase of the attack and is open during its release phase.

CALCULATIONS MADE DURING THE RELEASE PHASE

The release phase is initiated by the pilot by a second actuation of the stick mounted switch 18, to a firing position. This actuates switch means 7c and 7d (FIG. 8), 45a (FIG. 7), 57 and 69 (FIG. 10) and 88 (FIG. 15); and it also unlocks the release means 13.

During the release phase the computer continues to make essentially the same calculations as during the measuring phase, but it makes certain of them in a different manner; and, in addition it makes calculations relating to the trajectory of the bomb.

During the release phase the computer continues its calculation of $\overline{V}$, the velocity vector of the aircraft relative to the ground. This is still made by the mechanism represented by blocks 40, 41 and 43, but with the switch means 57 (FIG. 10) now open so that the air data transducers are disconnected from the instrument. Instead, $\overline{V}_L$ is calculated in the block 40 instrumentality on the basis of an integration of acceleration signals, to thus avoid dynamic errors from the air data transducers and the flight position (gyro) transducers and consequently obtain increased accuracy of the calculation during the relatively powerful but short pull-up maneuver.

The wind vector $\overline{W}$ is no longer determined by calculation during the release phase because in the instrumentality designated by block 41, the switch means 69 (FIG. 10), which had been closed during the directing and measuring phases, is now open. Consequently the instrument now holds and utilizes as a constant the final value of the wind vector $\overline{W}$ that was calculated at the conclusion of the measuring phase. Of course, if the Doppler unit was not operative, the instrument, during the release phase, continues to utilize the wind vector input supplied from the manual adjustment means 16d through switch means 70.

Since the target velocity vector $\overline{V}_T$ cannot be directly measured during the release phase, owing to the fact that the sighting mark and radar are then no longer fixed on the target, the final value of $\overline{V}_T$ that was calculated at the conclusion of the measuring phase is in effect frozen into the instrument through the release phase by opening of the switch means 88 in the block 46 instrumentality (FIG. 15). On the basis of that frozen $\overline{V}_T$ value the position vector $\overline{R}_F$ of the target relative to the aircraft is continuously extrapolated (i.e. calculated by dead reckoning) by means of the integrator 80.

In addition to the above explained calculations of $\overline{V}$ and $\overline{R}_F$, the instrument, during the release phase, makes a number of calculations which lead to the automatic emission of a bomb release impulse at the proper instant and which were not needed during the two preceding phases; and it also makes calculations which effect such positioning of the command display symbol on the screen 5 as will give the required pull up and banking instructions to the pilot.

Figure 19:
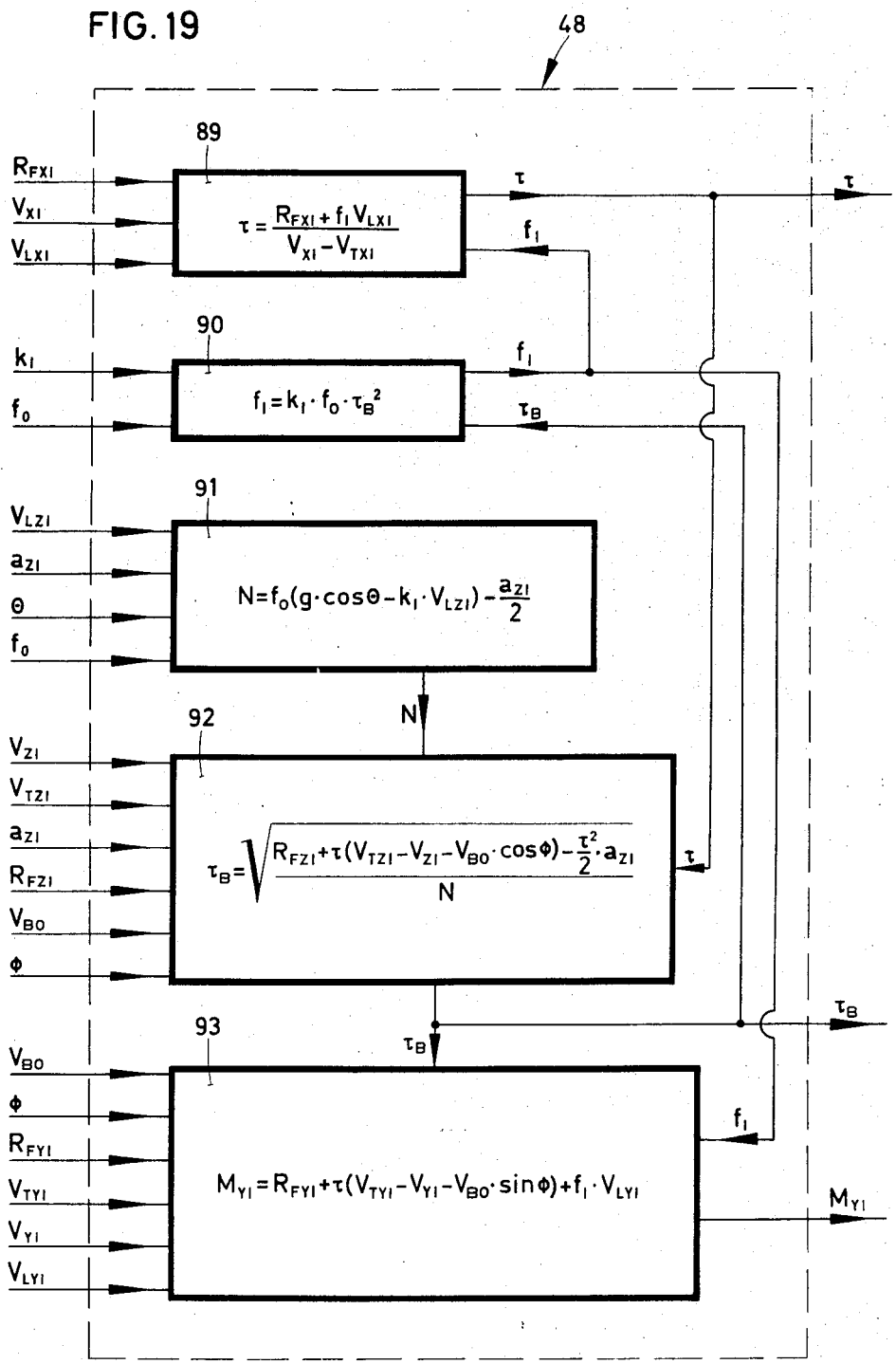
FIGS. 19, 20, 21 and 23 are further block diagrams illustrating how certain quantities are computed in the instrument.

An instrumentality represented by block 48 (FIG. 19) makes a calculation of release variables relating to:
$\tau$ = calculated time to bomb impact,
$\tau_B$ = calculated time interval during which the bomb falls, and
$M_{y1}$ = horizontal lateral impact error.

Figure 17:
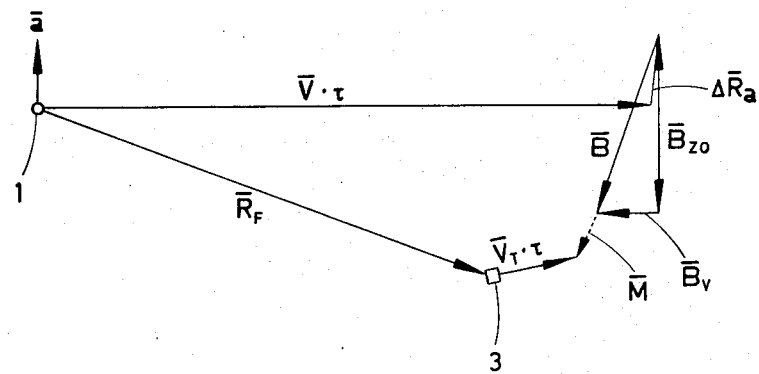
FIGS. 17 and 18 are vector diagrams illustrating vectors of the vector calculations which are performed in the computer of this invention, FIG. 17 being a vertical projection of the vectors and FIG. 18 a horizontal projection.
Figure 18:
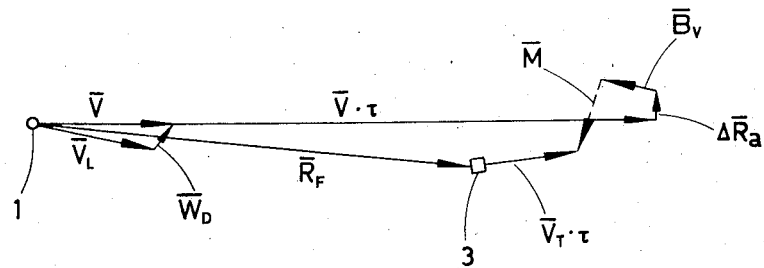

As illustrated in vertical section in FIG. 17 and in horizontal section in FIG. 18, the vector $\overline{M}$ of bomb impact error comprises the sum of a number of vectors:

$$\overline{M} = \overline{R}_F + (\overline{V}_T - \overline{V} - \overline{V}_{BO}) \cdot \tau - \overline{B} - \Delta \overline{R}_a,$$

wherein:
$\overline{V}_{BO}$ = separation velocity vector of the bomb due to its ejection by the bomb release mechanism
$\overline{B}$ = drop vector of the bomb relative to the aircraft under the influence of gravity and air drag, and
$\Delta \overline{R}_a$ = predicted vector for upward motion due to the aircraft's being in a pull-up at the instant of release.

The condition of release is calculated for the vertical plane by an iterative method using the time variables $\tau$ and $\tau_B$ in such a way that the components $M_{x1}$ and $M_{z1}$ of the error vector $\overline{M}$ in the vertical plane are continually retained at the value zero. The correct instant of release, generally speaking, is that at which $\tau = \tau_B$. The component $M_{y1}$ of the horizontal impact error (i.e., along the $y_1$-axis) is computed, and an output corresponding to the result of that computation is used in presenting the banking command $\phi_u$ on the display indicator, whereby the pilot is directed to so maneuver the aircraft that $M_{y1}$ is zero at the instant of bomb release.

In the instrumentality represented by block 48 (FIG. 19) the computation of the time variable $\tau$ is performed by means represented by block 89, which solves the equation set forth in block 89, for the condition $M_{x1} = 0$. For the computation made by the block 89 instrumentality, an input to that instrumentality is needed which corresponds to $f_1$, an auxiliary variable for the computation of bomb ballistic data, and that input is obtained from an instrumentality represented by block 90, which in turn receives inputs corresponding to $\tau_B$, duration of the bomb fall interval as calculated during the preceding computing cycle, and:

$k_1$ = air drag parameters for the bomb, and
$f_o$ = another auxiliary variable for calculation of bomb ballistic data. The ballistic parameter variables $k_1$ and $f_o$ are computed by an instrumentality represented by block 49 (FIG. 20), which is explained hereinafter.

The block 48 instrumentality also comprises instrumentalities represented by blocks 91 and 92. The block 91 instrumentality computes an auxiliary variable N, and the block 92 instrumentality computes the falling interval $\tau_B$ of the bomb by solving the equation set forth in that block, for the condition $M_{y1} = 0$. Finally, the block 48 instrumentality also comprises an instrumentality represented by block 93, computing the equation set forth therein for the remaining horizontal component of lateral impact error $M_{y1}$ of the impact error vector $\overline{M}$.

Figure 20:
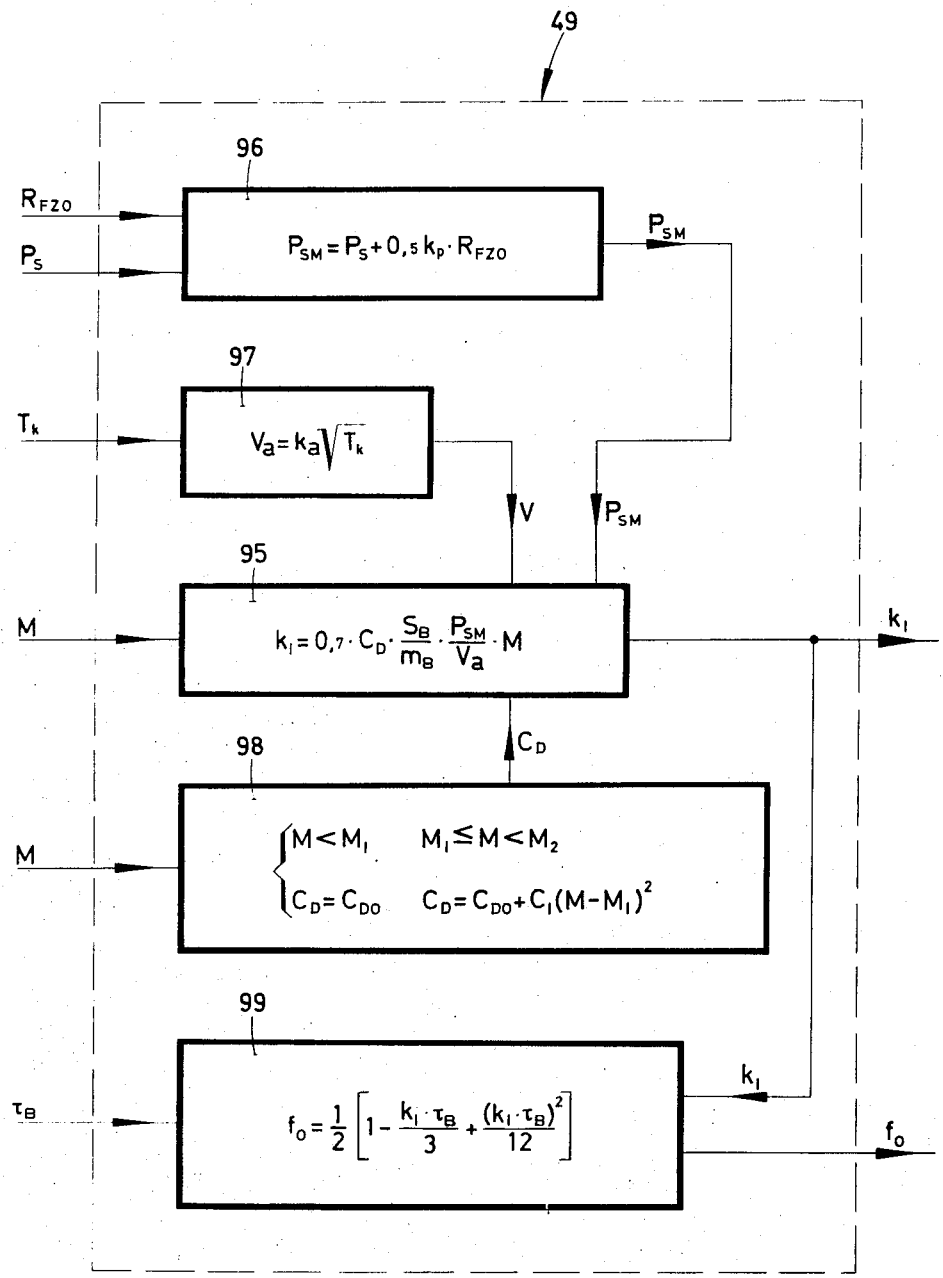

FIG. 20 illustrates the $k_1$ bomb ballistic data computations, which are made by an instrumentality represented by block 95, computing the equation set forth therein. The auxiliary variable $k_1$ (an air drag factor for the bomb) is computed on the basis of:

$C_D$ = the air drag coefficient of the bomb,
$S_B$ = aerodynamic reference surface for the bomb,
$m_B$ = the mass of the bomb,
$P_{sm}$ = average static pressure of the air affecting the bomb during its fall,
$V_a$ = velocity of sound, and
$M$ = Mach number. The block 95 instrumentality receives an input corresponding to Mach number from the air data transducers. It receives its input corresponding to $P_{sm}$ from an instrumentality denoted by block 96, which receives from the air data transducers an input corresponding to:
$P_S$ = barometric pressure at the altitude of the aircraft,
and an input corresponding to $R_{FZ0}$, the difference in elevation between the target and the aircraft at the instant of bomb release. In the computation made by the block 96 instrumentality, $k_p$ is an air pressure altitude conversion factor. The block 95 instrumentality also receives an input corresponding to temperature (absolute) $T_k$ and has built into it a value corresponding to
$k_a$ = constant of velocity of sound.
Finally, the block 95 instrumentality receives its $C_D$ input from another instrumentality, denoted by block 98, which effects variation of the $C_D$ input in accordance with whether the Mach number is less than a critical value at which air compressibility is encountered (in which case an input corresponding to the subsonic coefficient of bomb drag $C_{D0}$ is fed to the block 95 instrumentality) or is equal to or greater than said value, (in which case the $C_D$ input is modified correspondingly in accordance with its known variation with such higher Mach number). The $C_D$ computation is of course individually adapted to the type of bomb being used.

The auxiliary variable $f_o$ is computed by means of an instrumentality denoted by block 99, which receives inputs corresponding to $k_1$ and $\tau_B$ and has built into it certain numerical constants so that it computes the equation shown in that block.

Figure 21:
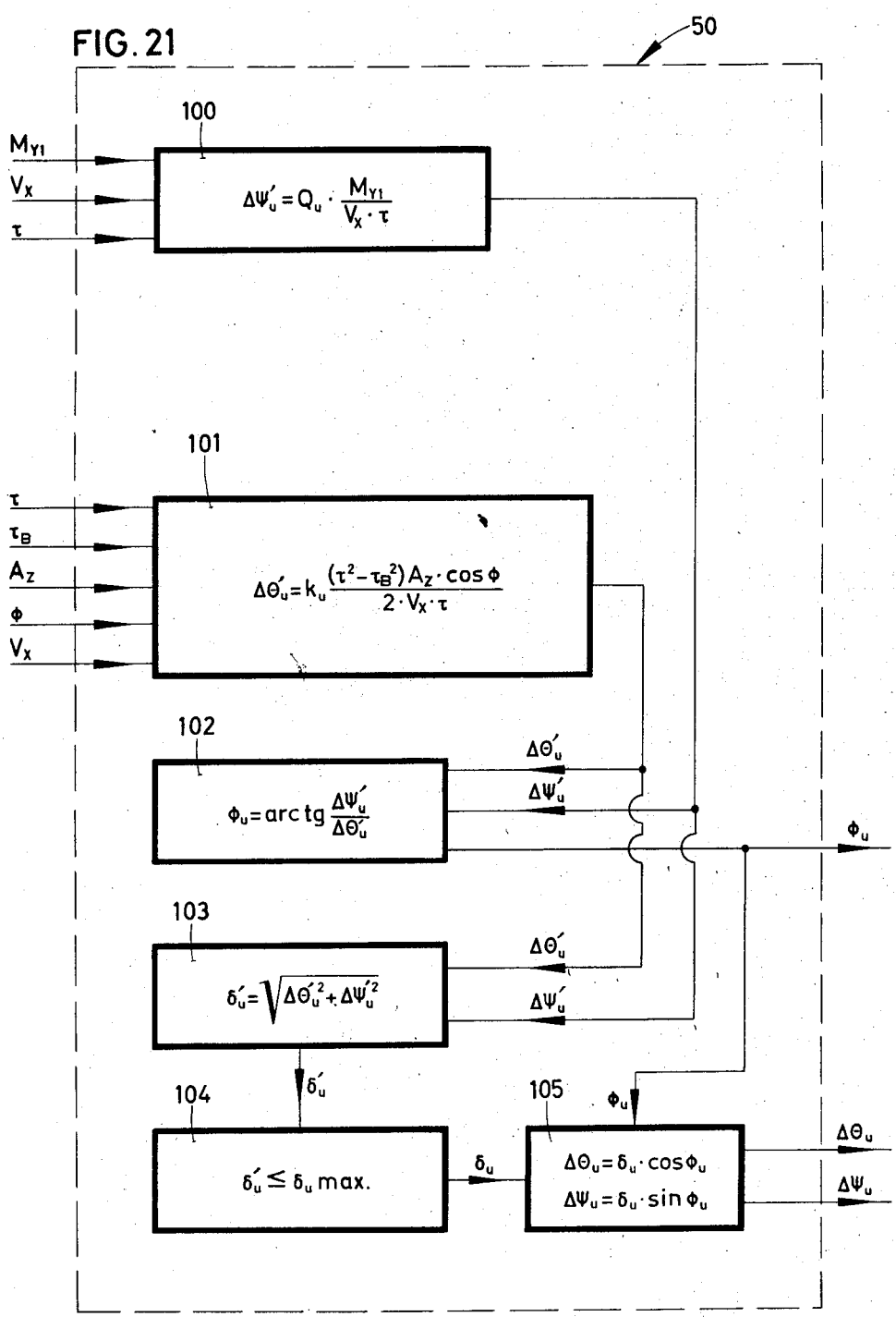

An instrumentality denoted by block 50 (FIG. 21) computes the necessary pull up and roll commands which are displayed to the pilot and in following which he brings the aircraft to the calculated position at the calculated time for bomb release. Note that at the instant that the release phase begins the switch means $45_a$ is moved from its position shown in FIG. 7 to its alternate position in which it connects the instrumentalities of blocks 48, 49 and 50 with the display means 6.

Figure 22:
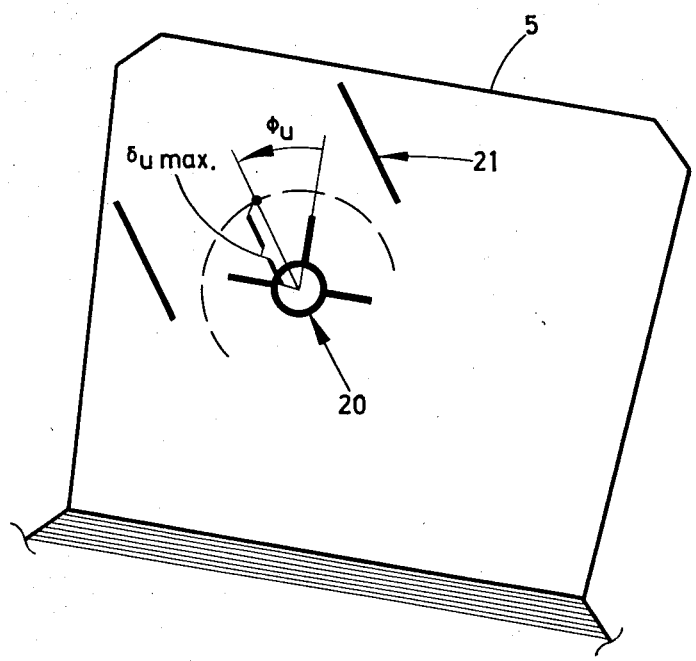
FIG. 22 is a diagram illustrating a limitation of the angle of pull up for presentation of the pull up and banking command on the sighting indicator.
Figure 23:
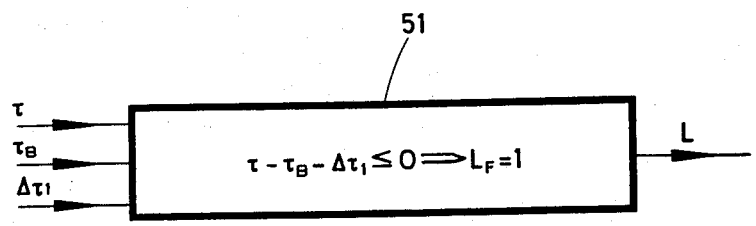

The apparatus of block 50 comprises an instrumentality denoted by block 100 (FIG. 21) which computes a horizontal angular (yaw) component $\Delta\psi'_u$, and another instrumentality denoted by block 101 which computes a vertical angular (pitch) component $\Delta\theta'_u$. The outputs of the instrumentalities denoted by blocks 100 and 101 are fed to an instrumentality denoted by block 102 which has an output that corresponds to a commanded bank $\phi_u$. This output controls the angular displacement of the lines 21 of the sighting symbol 21a from parallelism with the aircraft's z-axis, as illustrated in FIG. 22. By means of an instrumentality denoted by block 103, receiving inputs corresponding to $\Delta\theta'_u$ and $\Delta\psi'_u$, an output is produced which corresponds to $\delta'_u$, the required angle of radial pull up. The $\delta'_u$ output is fed to a limiting means, denoted by block 104, which limits it to not in excess of a predetermined value $\delta u_{max}$, so that the pilot will not receive a command that requires him to perform an excessively abrupt maneuver, thus making it easier for him to achieve the required banking. An instrumentality denoted by block 105, which receives inputs corresponding to $\delta_u$, the limited value of $\delta'_u$, and to $\phi_u$, produces outputs corresponding to $\Delta\theta_u$ and $\Delta\psi_u$, the vertical and lateral displacements, respectively, of the aiming dot 25 relative to the center of the situation display symbol 20, Finally, the release impulse computation is made by a summing instrumentality represented by box 51 (FIG. 23), which causes a triggering output to issue to the bomb release impulse mechanism 13 when the release condition is satisfied, namely:

$$\tau - \tau_B - \Delta\tau_1 \leq 0,$$

wherein $\Delta\tau_1$ is a constant that represents minor existing mechanical time delays in the bomb release mechanism. The inequality sign expresses the fact that the release impulse is issued a very small fraction of a second after the calculated release instant, owing to the sampling time required to obtain and calculate data.

From the foregoing description taken with the accompanying drawings it will be apparent that this invention provides an aircraft bombing instrument which enables a pilot to aim his aircraft toward a target that is in relative motion transversely to his line of flight, and which subsequently so directs him as to cause him to put his aircraft into a curving flight path over the ground and effects automatic release of a bomb at an instant while the aircraft is in such curving flight path, which instant is so computed that the bomb then released will strike the target.

Those skilled in the art will appreciate that the invention can be embodied in forms other than as herein disclosed for purposes of illustration.

The invention is defined by the following claims.

We claim:

1. A bombing instrument by which a bomb can be accurately released from an aircraft while the same is moving in a curving flight path, and which is of the type comprising means for calculating data concerning the relationship between the aircraft and a selected target during an interval in which a defined sight axis in the aircraft is maintained aligned with the target by maneuvering the aircraft, means for calculating the velocity vector of the aircraft required to impart to a bomb released from the aircraft a trajectory that will terminate in a desired relationship to the target, and means for comparing the prevailing velocity vector of the aircraft with the calculated required velocity vector and for issuing a bomb release impulse when a predetermined relationship exists between said prevailing and required velocity vectors, said bombing instrument comprising:
  A. calculating means, associated with said means for calculating the required velocity vector and operative continuously from the end of said interval to the instant of bomb release, for calculating the values of bank and pull-up of the aircraft needed for it to attain the required velocity vector within a predetermined time following the end of said interval; and
  B. means operatively associated with the last mentioned calculating means for issuing command signals corresponding to the calculated values of bank and pull-up, which signals can be utilized to bring the aircraft to the required velocity vector.

2. The bombing instrument of claim 1 wherein said command symbol issuing means further comprises
  1. display means within the normal field of vision of the pilot of the aircraft, and
  2. means for delineating symbols on said display means that signify required values of bank and pull up.

3. The bombing instrument of claim 2 wherein said display means comprises a transparent screen within the normal forward field of vision of the pilot of the aircraft, further comprising:
  D. means for displaying on said transparent screen a symbol which defines said sight axis; and
  E. manually adjustable mans for so controlling the position of said sight axis symbol that the sight axis defined thereby can have a predetermined inclination, laterally and vertically, to the longitudinal axis of the aircraft.

4. Means for defining for the pilot of a weapon carrying aircraft a sighting axis which the pilot can align with a selected target by maneuvering the aircraft and thereby so aim the aircraft that a weapon released therefrom will follow a trajectory that terminates in a desired relationship to the target, said means comprising:
  A. sight means for displaying within the pilot's normal forward field of vision a symbol which denotes a point on the sighting axis and which is movable to and from a position corresponding to a predetermined angular relationship of the sighting axis to the longitudinal axis of the aircraft;
  B. calculating means operatively associated with sensing transducers in the aircraft for calculating the velocity vector of the aircraft relative to the ground and for producing outputs which correspond to the changing values of the calculated velocity vector; and
  C. means so connecting said calculating means with said sight means as to cause displacement of said symbol from said position in correspondence with divergence of the calculated velocity vector from parallelism with the longitudinal axis of the aircraft.

5. The apparatus of claim 4, further comprised:
  D. means comprising a manually adjustable control for establishing said position in a predetermined laterally divergent relationship to the longitudinal axis of the aircraft.

6. The apparatus of claim 4, further comprising:
  D. means comprising a manually adjustable control for establishing said position in a predetermined downwardly divergent relationship to the longitudinal axis of the aircraft.

7. The apparatus of claim 6, further comprising:
  E. means comprising a further manually adjustable control for establishing said position in a laterally divergent relationship to the longitudinal axis of the aircraft; and
  F. means for limiting the lateral divergence of said position in correspondence with the amount of vertical divergence thereof.

8. A bombing instrument for a piloted aircraft, for effecting accurate release of a bomb from the aircraft onto a target that has relative motion transversely to the flight path of the aircraft at the beginning of the bombing attack, and which instrument cooperates with transducer means in the aircraft that produce signals corresponding to variables measurable at the aircraft, said bombing instrument comprising:
  A. sighting symbol display means within the pilot's normal range of vision providing
    1. a situation display symbol that represents the direction of the prevailing velocity vector of the aircraft relative to a selected longitudinal axis fixed in the aircraft, and
    2. a command display symbol that denotes a maneuvering instruction to the pilot;
  B. switch means manually operable to initiate and establish each of three successive conditions of the instrument.
    1. in the first and second of which the command display symbol defines a sight axis which the pilot maintains aligned with the target by maneuvering the aircraft, and
    2. in the third of which the instrument causes the command display symbol to represent maneuvering commands to the pilot, in following which he brings the aircraft to a velocity vector calculated for bomb release at a calculated time;
  C. means cooperable with the sighting symbol display means, and comprising manually adjustably control means, for effecting a predetermined lateral displacement of the command display symbol so that the sight axis defined thereby during the first and second conditions of the instrument can be at a laterally oblique angle to said longitudinal axis of the aircraft;

D. means cooperable with at least certain of the transducers and operative during the first and second conditions of the instrument for automatically calculating
  1. the vector of velocity and direction of motion of the aircraft relative to the ground, and
  2. the wind vector;

E. means operative during the second and third conditions of the instrument and cooperating with the last mentioned vector calculating means to automatically calculate
  1. the position vector of the target relative to the aircraft, and
  2. the vector of velocity and direction of motion of the target relative to the aircraft;

F. means operative in the third condition of the instrument and cooperable with the transducer means for calculating
  1. a time while the instrument is in said third condition at which a bomb is to be released,
  2. the velocity vector required for the aircraft at said calculated time, on the basis of the trajectory vector for the bomb released at said time, and
  3. the rates of pull up and roll required for the aircraft to achieve said required velocity vector at said calculated time;

G. means connected with the last named calculating means and with the sighting symbol display means for positioning the command display signal in accordance with the calculated values of required pull up and roll; and H. means for issuing a bomb release impulse at said calculated time.

9. An instrument for use in making a bombing attack with a piloted aircraft against a target that has a component of relative motion transverse to the flight path of the aircraft at the initiation of the bombing attack, and by which instrument a bomb release impulse in automatically issued when a bomb released from the aircraft will have a trajectory that terminates in a desired relationship to the target, said instrument being cooperable with sensors in the aircraft that produce outputs corresponding to quantities measurable at the aircraft and comprising:

A. first switch means responsive to manual actuation to place the instrument in a first condition of operation;

B. first calculating instrumentalities rendered operative by actuation of said first switch means and cooperating with sensors to produce outputs corresponding to the changing values of
  1. the velocity vector of the aircraft relative to the air,
  2. the velocity vector of the wind, and
  3. the velocity vector of the aircraft relative to the ground;

C. display means within the pilot's normal range of forward vision defining a sighting axis that has predetermined angular displacements laterally and vertically relative to the longitudinal axis of the aircraft;

D. second switch means responsive to manual actuation to place the instrument in a second condition of operation;

E. second calculating instrumentalities rendered operative by actuation of said second switch means and cooperating with sensors and with the first calculating instrumentalities, while the aircraft is maneuvered to maintain alignment upon a target of the sighting axis defined by the display means, to produce additional outputs corresponding to the changing values of
  1. the velocity vector of the target, and
  2. the position vector of the target relative to the aircraft;

F. command display means for displaying instructions to the pilot concerning
  1. a required angle of bank, and
  2. a required pull up;

G. third switch means responsive to manual actuation to place the instrument in a third condition of operation; and H. third calculating instrumentalities rendered operative by actuation of said third switch means and connected with the first and second calculating instrumentalities to receive their outputs and issue outputs corresponding to
  1. the velocity vector of the aircraft required to cause a bomb released from the aircraft to follow a trajectory that terminates in a desired relationship to the target, and
  2. the bank and the pull up required to bring the aircraft to the calculated velocity vector within a predetermined time following actuation of the third switch means;

I. means for controlling the command display means in accordance with said outputs corresponding to required bank and pull up; and J. means for issuing a bomb release impulse when the aircraft attains the calculated velocity vector.

10. An instrument for use in making a bombing attack with a piloted aircraft against a target that has a component of relative motion transverse to the flight path of the aircraft at the initiation of the bombing attack, and by which instrument a bomb release impulse is automatically issued when a bomb released from the aircraft will have a trajectory that terminates in a desired relationship to the target, said instrument being cooperable with sensors in the aircraft that produce outputs corresponding to quantities measurable at the aircraft and comprising:

A. first switch means responsive to manual actuation to place the instrument in a first condition of operation;

B. first calculating instrumentalities rendered operative by actuation of said first switch means and cooperating with sensors to produce outputs corresponding to the changing values of
  1. the velocity vector of the aircraft relative to the air,
  2. the velocity vector of the wind, and
  3. the velocity vector of the aircraft relative to the ground;

C. display means within the pilot's normal range of forward vision defining a sighting axis that has predetermined angular displacements laterally and vertically relative to the longitudinal axis of the aircraft;

D. second switch means responsive to manual actuation to place the instrument in a second condition of operation;
E. second calculating instrumentalities rendered operative by actuation of said second switch means and cooperating with sensors and with the first calculating instrumentalities, while the aircraft is maneuvered to maintain alignment upon a target of the sighting axis defined by the display means, to produce additional outputs corresponding to the changing values of
  1 the velocity vector of the target, and
  2. the position vector of the target relative to the aircraft;
F. third switch means responsive to manual actuation to place the instrument in a third condition of operation; and
G. third calculating instrumentalities rendered operative by actuation of said third switch means and connected with the first and second calculating instrumentalities to receive their outputs, for calculating the values of
  1. the velocity vector of the aircraft required to cause a bomb released from the aircraft to follow a trajectory that terminates in a desired relationship to the target, and
  2. the bank and the pull up required to bring the aircraft to the calculated required velocity vector within a predetermined interval following actuation of said third switch means;
H. means connected with said third calculating instrumentalities for issuing outputs corresponding to the values calculated by said third calculating instrumentalities so that the aircraft can be caused to assume the required bank and pull-up; and
I. means connected with said third calculating instrumentalities and with at least certain of said sensors for issuing a bomb release impulse when the aircraft attains the calculated required velocity vector.

11. Means for use in making a bombing attack with a piloted aircraft to enable a bomb to be released from the aircraft along a trajectory that terminates in a desired relationship to a target selected by the aircraft pilot and which target can be one having relative motion transverse to the flight path of the aircraft at the beginning of the bombing attack, said means cooperating with transducers in the aircraft that produce signals corresponding to variables measurable at the aircraft, and said means comprising:
A. sighting means for displaying within the pilot's normal field of vision a sight axis symbol having a predeterminable relationship to the longitudinal axis of the aircraft and which the pilot can maintain aligned with a target by maneuvering the aircraft;
B. manually adjustable means for displacing said sight axis symbol laterally so that the sight axis defined by the symbol can be at a laterally oblique angle to the longitudinal axis of the aircraft;
C. switch means manually operable by the pilot when the sight axis defined by said symbol is aligned with a selected target;
D. first computer means, rendered operative by said switch means and cooperating with the transducers and said manually adjustable means for displacing the sight axis symbol, for calculating
  1. the vector of velocity and direction of motion of the aircraft relative to the ground,
  2. the vectors of velocity and position of the target relative to the aircraft, and
  3. a predicted instant at which a bomb is to be released from the aircraft;
E. second computer means adapted to be operative during a predetermined interval which terminates at substantially said predicted instant and cooperable with the first computer means and with at least certain of the transducers for calculating
  1. the velocity vector of the aircraft required at said predicted instant to cause a bomb then released from the aircraft to follow a trajectory that terminates in the desired relationship to the target, and
  2. the values of bank and pull-up required to bring the aircraft to said required velocity vector at said predicted instant;
F. command means connected with said second computer means for issuing outputs corresponding to said values calculated by the second computer means so that the aircraft can be caused to assume the required bank and pull-up; and
G. means connected with at least certain of the transducers and with the second computer means for issuing a bomb release impulse when the aircraft attains said required velocity vector.

* * * * *